US011659632B2

(12) United States Patent
Suga

(10) Patent No.: US 11,659,632 B2
(45) Date of Patent: May 23, 2023

(54) INDUCTION COOKER WITH PLURALITY OF HEATING COILS

(71) Applicant: Mitsubishi Electric Corporation, Tokyo (JP)

(72) Inventor: Ikuro Suga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 336 days.

(21) Appl. No.: 16/970,817

(22) PCT Filed: Mar. 16, 2018

(86) PCT No.: PCT/JP2018/010610
§ 371 (c)(1),
(2) Date: Aug. 18, 2020

(87) PCT Pub. No.: WO2019/176110
PCT Pub. Date: Sep. 19, 2019

(65) Prior Publication Data
US 2021/0307124 A1 Sep. 30, 2021

(51) Int. Cl.
*H05B 6/06* (2006.01)
*H02M 7/537* (2006.01)
*H05B 6/12* (2006.01)

(52) U.S. Cl.
CPC .......... *H05B 6/065* (2013.01); *H02M 7/537* (2013.01); *H05B 6/1272* (2013.01); *H05B 2213/05* (2013.01)

(58) Field of Classification Search
CPC .. H05B 6/065; H05B 6/1272; H05B 2213/05; H05B 2213/03; H05B 6/062; H05B 6/04; H05B 2213/07; H05B 6/06; H05B 6/1209; H05B 1/0266; H05B 3/68; H05B 6/1254; H05B 2206/022; H05B 3/12; H05B 6/36;
(Continued)

(56) References Cited

U.S. PATENT DOCUMENTS 3,710,062 A 1/1973 Peters
3,786,222 A * 1/1974 Hamden, Jr. ............ H05B 6/06
219/622
(Continued)

FOREIGN PATENT DOCUMENTS

EP 2846607 A1 3/2015
EP 3 285 546 A1 2/2018
(Continued)

OTHER PUBLICATIONS

Office Action dated Jan. 26, 2022 issued in corresponding CN patent application No. 201880091106.3 (and English translation).
(Continued)

*Primary Examiner* — Tu B Hoang
*Assistant Examiner* — Vy T Nguyen
(74) *Attorney, Agent, or Firm* — Posz Law Group, PLC

(57) ABSTRACT

An induction cooker according to the present invention includes: a plurality of heating coils aligned in one row on a same plane; and a controller. The controller is configured to, when a heating target is placed over adjacent two or more of the plurality of heating coils, supply electric power to at least one, but not all, of the two or more adjacent ones of the plurality of heating coils and change, over time, the heating coils to which the power is supplied.

14 Claims, 25 Drawing Sheets

(58) Field of Classification Search
CPC .. H05B 2203/037; H05B 6/08; H05B 6/1245; H05B 6/1263; H05B 6/362; H05B 6/40; H05B 6/44; H02M 7/537; F24C 7/083; F24C 7/00
USPC ....... 219/620, 624, 622, 626, 660, 662, 661, 219/664, 672, 489, 621, 627, 663, 670, 219/443.1, 445.1, 447.1, 518, 601, 625, 219/665, 666, 671
See application file for complete search history.

(56) References Cited

U.S. PATENT DOCUMENTS

| | | | | |
|---|---|---|---|---|
| 6,259,069 | B1 * | 7/2001 | Schotten | H05B 3/746 |
| | | | | 219/447.1 |
| 9,055,615 | B2 * | 6/2015 | Watanabe | H05B 6/062 |
| 2016/0021708 | A1 | 1/2016 | Teramoto et al. | |

FOREIGN PATENT DOCUMENTS

| | | | | | |
|---|---|---|---|---|---|
| EP | 3291642 | A1 | | 3/2018 | |
| EP | 3291642 | A1 | * | 3/2018 | ............. H05B 6/065 |
| JP | H08-78148 | A | | 3/1996 | |
| JP | 2978069 | B2 | * | 11/1999 | |
| JP | 2008287923 | A | * | 11/2008 | |
| JP | 2009-158225 | A | | 7/2009 | |
| JP | 2012-079581 | A | | 4/2012 | |
| JP | 2013-109889 | A | | 6/2013 | |
| JP | 2013109889 | A | * | 6/2013 | |
| JP | 2013-201141 | A | | 10/2013 | |
| JP | 2013-218942 | A | | 10/2013 | |
| JP | 2013201141 | A | * | 10/2013 | |
| JP | 2014-017273 | A | | 1/2014 | |
| JP | 2016-207255 | A | | 12/2016 | |
| JP | 2017-135119 | A | | 8/2017 | |
| WO | WO-2016181653 | A1 | * | 11/2016 | ............. H05B 6/062 |
| WO | 2017/081859 | A1 | | 5/2017 | |
| WO | WO-2017081859 | A1 | * | 5/2017 | ............... H05B 6/12 |

OTHER PUBLICATIONS

International Search Report of the International Searching Authority dated Jun. 19, 2018 for the corresponding International application No. PCT/JP2018/010610 (and English translation).

Office Action dated May 18, 2021 issued in corresponding JP patent application No. 2020-506098 (and English translation).

Extended European Search Report dated Feb. 12, 2021, issued in corresponding European Patent Application No. 18909385.9.

* cited by examiner

INDUCTION COOKER WITH PLURALITY OF HEATING COILS

CROSS REFERENCE TO RELATED APPLICATION

This application is a U.S. national stage application of International Application No. PCT/JP2018/010610, filed on Mar. 16, 2018, the contents of which are incorporated herein by reference.

TECHNICAL FIELD

The present invention relates to an induction cooker including a plurality of heating coils.

BACKGROUND

A conventional induction cooker includes a body having a top plate on which a heating target is placed and a heating coil unit configured to inductively heat the heating target placed on the top plate. The heating coil unit has at least four heating coils aligned in one row on the same plane (see, for example, Patent Literature 1).

PATENT LITERATURE

Patent Literature 1: Japanese Unexamined Patent Application Publication No. 2016-207255

It is desirable that an induction cooker be configured to, in heating a liquid cooking target contained in a heating target such as a pot, perform a heating operation of promoting convection in the liquid cooking target and thereby reduce nonuniformity in temperature of the cooking target and scorching of the cooking target.

However, the induction cooker described in Patent Literature 1 exercises no control of any sort to produce convection in a cooking target contained in a heating target. For this reason, there arises a problem that heating a liquid cooking target contained in a heating target causes nonuniformity in temperature of the cooking target and scorching of the cooking target.

SUMMARY

The present invention was made to solve the above problem and provides an induction cooker configured to promote convection in a liquid cooking target contained in a heating target and reduce nonuniformity in temperature of the cooking target and scorching of the cooking target.

An induction cooker according to an embodiment of the present invention includes: a plurality of heating coils aligned in one row on a same plane; a plurality of inverter circuits configured to supply high-frequency power to the plurality of heating coils; a load determination unit configured to determine whether a heating target is placed above each of the plurality of heating coils; and a controller configured to control driving of the plurality of inverter circuits based on a result of detection by the load determination unit, the controller being configured to, when the heating target is placed over adjacent two or more of the plurality of heating coils, supply electric power to at least one, but not all, of the two or more adjacent ones of the plurality of heating coils and change, over time, the heating coils to which the power is supplied.

The embodiment of the present invention is configured to supply electric power to at least one, but not all, of the two or more adjacent ones of the plurality of heating coils and change, over time, the heating coils to which the power is supplied. This makes it possible to promote convection in a liquid cooking target contained in the heating target and reduce nonuniformity in temperature of the cooking target and scorching of the cooking target.

DETAILED DESCRIPTION

Embodiment 1

(Configuration)

Figure 1:
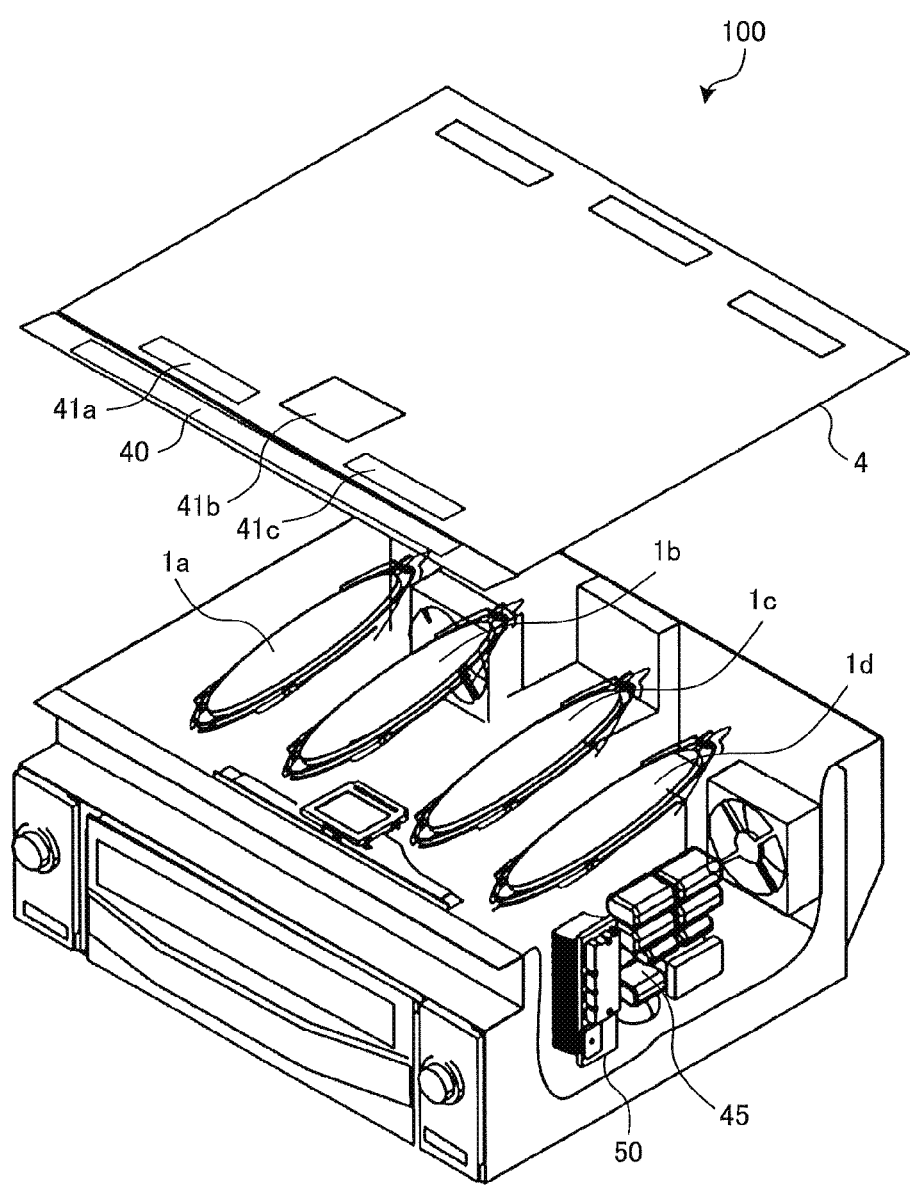
FIG. 1 is an exploded perspective view showing an induction cooker according to Embodiment 1.

FIG. 1 is an exploded perspective view showing an induction cooker according to Embodiment 1.

Figure 2:
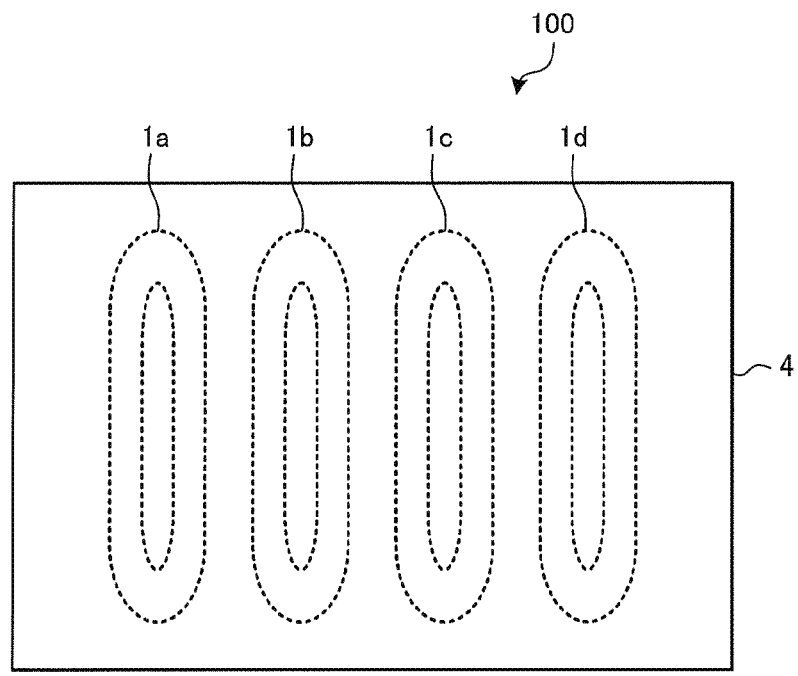
FIG. 2 is a plan view schematically showing a plurality of heating coils of the induction cooker according to Embodiment 1.

FIG. 2 is a plan view schematically showing a plurality of heating coils of the induction cooker according to Embodiment 1.

As shown in FIGS. 1 and 2, the induction cooker 100 has at the top thereof a top plate 4 on which a heating target such as a pot is placed. The top plate 4 is made entirely of an infrared-transparent material such as heat-resistant tempered glass or crystallized glass.

The induction cooker 100 includes a plurality of heating coils aligned in one row on the same plane. The plurality of heating coils are disposed below the top plate 4. In the example shown in FIG. 2, the induction cooker 100 includes a four heating coils, namely a first heating coil 1a, a second heating coil 1b, a third heating coil 1c, and a fourth heating coil 1*d*. For example, the first to fourth heating coils 1*a* to 1*d* are aligned in one row in a transverse direction of the top plate 4.

The first to fourth heating coils 1*a* to 1*d* are each constituted by winding a conducting wire subjected to insulating coating and made of metal. The conducting wires may be made of any metal such as copper or aluminum. Further, the first to fourth heating coils 1*a* to 1*d* have their conducting wires wound independently of one another.

The first to fourth heating coils 1*a* to 1*d* are formed, for example, in elliptical shapes in plan view. The first to fourth heating coils 1*a* to 1*d* have the same shape and the same size as one another. Note here that the phrase "the same shape and the same size" is not limited to strictly the same shape and the same size but encompasses errors caused by manufacturing errors or other errors and allows for substantially the same shape and substantially the same size.

The shapes of the first to fourth heating coils 1*a* to 1*d* are not limited to elliptical shapes. The shapes of the first to fourth heating coils 1*a* to 1*d* may for example be quadrangular shapes or other shapes.

In the following description, the first heating coil 1*a*, the second heating coil 1*b*, the third heating coil 1*c*, and the fourth heating coil 1*d* are sometimes collectively referred to as "each heating coil".

At a location near the front edge of the top plate 4, an operation unit 40 is provided as an input device for configuring the settings for input power and a cooking menu or other settings in heating a heating target with the first to fourth heating coils 1*a* to 1*d*. The cooking menu includes, for example, a water boiler mode, a fryer mode, a convector mode, or other modes. The convector mode is a cooking menu of causing convection in a liquid cooking target contained in a heating target in cooking such as stewing or noddle boiling. Details will be described later.

Further, in the vicinity of the operation unit 40, a display unit 41 configured to display, for example, an operating status of each heating coil and the contents of an input and an operation from the operation unit 40 is provided as a notification unit. In Embodiment 1, the display unit 41 is divided into a display unit 41*a*, a display unit 41*b*, and a display unit 41*c* for each separate induction heating unit.

The operation unit 40 is constituted, for example, by a mechanical switch such as a push switch and a tactile switch, a touch switch that senses an input operation through a change in electrostatic capacitance of an electrode, or other switches. Further, the display unit 41 is constituted, for example, by an LCD, an LED, or other devices.

The operation unit 40 and the display unit 41 may be integrated to constitute an operation display unit 43. The operation display unit 43 is constituted, for example, by a touch panel including an LCD and a touch switch disposed on an upper surface of the LCD.

LCD is an abbreviation for liquid crystal device. Further, LED is an abbreviation for light-emitting diode.

Inside the induction cooker 100, a driver circuit 50 configured to supply high-frequency power to the first to fourth heating coils 1*a* to 1*d* is provided. Further, inside the induction cooker 100, a control unit 45 for controlling operation of the induction cooker 100 as a whole including the driver circuit 50 is provided.

The supply of high-frequency power to the first to fourth heating coils 1*a* to 1*d* by the driver circuit 50 causes high-frequency magnetic fields to be generated from the first to fourth heating coils 1*a* to 1*d*. The driver circuit 50 is provided for each heating coil. The driver circuit 50 may be the same in circuit configuration or may vary in circuit configuration from one heating coil to another. A configuration of the driver circuit 50 will be described in detail later.

Figure 3:
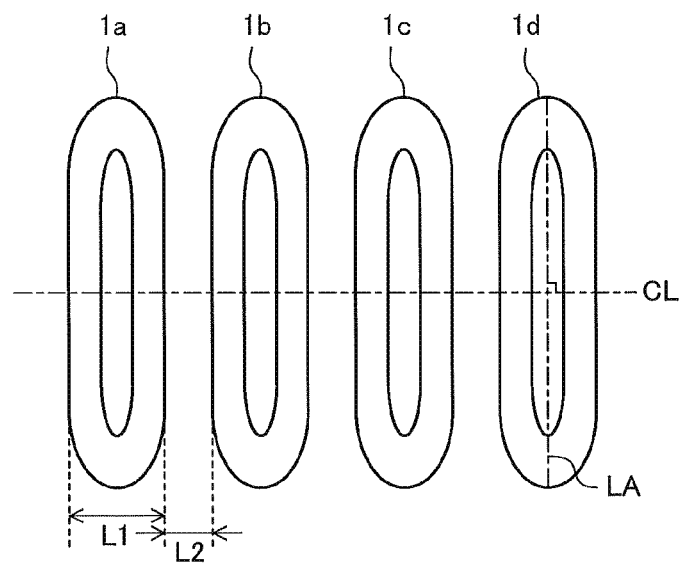
FIG. 3 is a plan view explaining alignment of the plurality of heating coils of the induction cooker according to Embodiment 1.

FIG. 3 is a plan view explaining alignment of the plurality of heating coils of the induction cooker according to Embodiment 1.

As shown in FIG. 3, the elliptical shapes of the first to fourth heating coils 1*a* to 1*d* have their minor axes aligned in a straight line CL. That is, the first to fourth heating coils 1*a* to 1*d* are aligned in one row so that major axes LA of the elliptical shapes are orthogonal to the straight line CL. Further, the first to fourth heating coils 1*a* to 1*d* are aligned so that a spacing L2 between adjacent two of the first to fourth heating coils 1*a* to 1*d* is shorter than a half of a length L1 of the minor axis of each of the first to fourth heating coils 1*a* to 1*d*.

Figure 4:
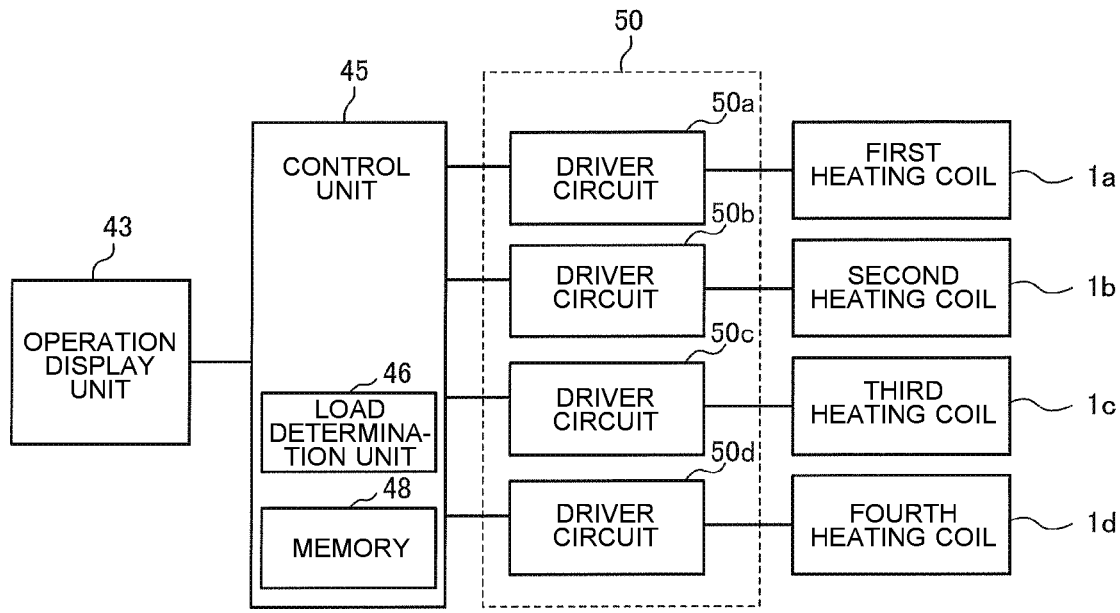
FIG. 4 is a block diagram showing a configuration of the induction cooker according to Embodiment 1.

FIG. 4 is a block diagram showing a configuration of the induction cooker according to Embodiment 1.

As shown in FIG. 4, the driver circuit 50 includes a driver circuit 50*a*, a driver circuit 50*b*, a driver circuit 50*c*, and a driver circuit 50*d*. The driver circuit 50*a* controls driving of the first heating coil 1*a*. The driver circuit 50*b* controls driving of the second heating coil 1*b*. The driver circuit 50*c* controls driving of the third heating coil 1*c*. The driver circuit 50*d* controls driving of the fourth heating coil 1*d*.

The supply of a high-frequency current from the driver circuit 50*a* to the first heating coil 1*a* causes a high-frequency magnetic field to be generated from the first heating coil 1*a*. The supply of a high-frequency current from the driver circuit 50*b* to the second heating coil 1*b* causes a high-frequency magnetic field to be generated from the second heating coil 1*b*. The supply of a high-frequency current from the driver circuit 50*c* to the third heating coil 1*c* causes a high-frequency magnetic field to be generated from the third heating coil 1*c*. The supply of a high-frequency current from the driver circuit 50*d* to the fourth heating coil 1*d* causes a high-frequency magnetic field to be generated from the fourth heating coil 1*d*.

The control unit 45 is constituted by dedicated hardware or a CPU that executes a program stored in a memory 48. Further, the control unit 45 includes a load determination unit 46 configured to determine whether a heating target is placed above each of the first to fourth heating coils 1*a* to 1*d*.

CPU is an abbreviation for central processing unit. Further, the CPU is also referred to as "central processing unit", "processing unit", or "arithmetic unit".

In a case where the control unit 45 is dedicated hardware, the control unit 45 corresponds, for example, to a single circuit, a composite circuit, an ASIC, an FPGA, or a combination thereof. Each functional unit that is implemented by the control unit 45 may be implemented by individual hardware, or each functional unit may be implemented by one piece of hardware.

ASIC is an abbreviation for application-specific integrated circuit. Further, FPGA is an abbreviation for field-programmable gate array.

In a case where the control unit 45 is a CPU, each function that is executed by the control unit 45 is implemented by software, firmware, or a combination thereof. The software and the firmware are described as programs and stored in the memory 48. The CPU implements each function of the control unit 45 by reading out and executing a program stored in the memory 48. Note here that an example of the memory 48 is a nonvolatile or volatile semiconductor memory such as a RAM, a ROM, a flash memory, an EPROM, or an EEPROM.

Some of the functions of the control unit 45 may be implemented by dedicated hardware, and others may be implemented by software or firmware.

RAM is an abbreviation for random-access memory. Further, ROM is an abbreviation for read-only memory. Further, EPROM is an abbreviation for erasable programmable read-only memory. Further, EEPROM is an abbreviation for electrically erasable programmable read-only memory.

Figure 5:
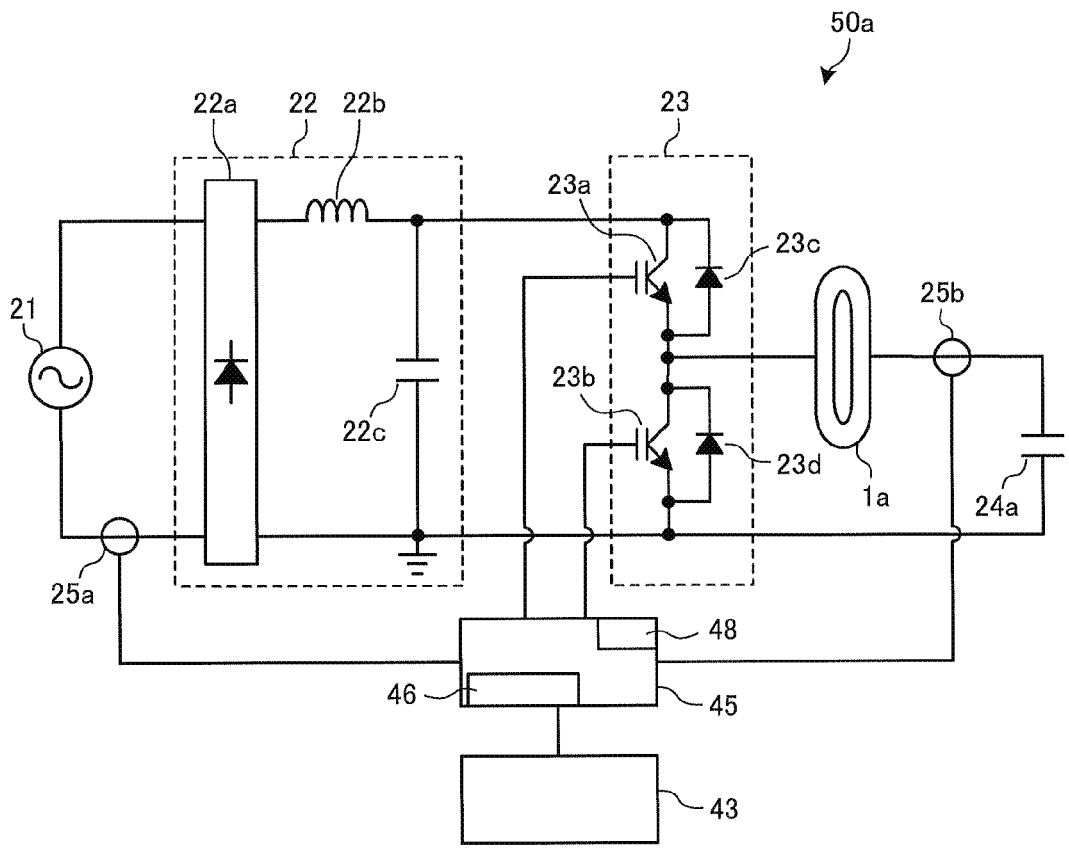
FIG. 5 is a diagram showing a driver circuit of the induction cooker according to Embodiment 1.

FIG. 5 is a diagram showing a driver circuit of the induction cooker according to Embodiment 1.

The driver circuits 50a to 50d may be the same in circuit configuration, or may vary in circuit configuration from one heating coil to another. FIG. 5 illustrates the driver circuit 50a, which drives the first heating coil 1a.

As shown in FIG. 5, the driver circuit 50a includes a DC power supply circuit 22, an inverter circuit 23, and a resonant capacitor 24a.

The DC power supply circuit 22 includes a diode bridge 22a, a reactor 22b, and a smoothing capacitor 22c. The DC power supply circuit 22 converts an AC voltage inputted from an AC power supply 21 into a DC voltage and outputs the DC voltage to the inverter circuit 23. The DC power source circuit 22 may be shared by the driver circuits 50a to 50d.

The inverter circuit 23 includes an IGBT 23a and an IGBT 23b, connected in series to an output of the DC power supply circuit 22, that serve as switching elements. The inverter circuit 23 includes a diode 23c and a diode 23d, connected in parallel to the IGBT 23a and the IGBT 23b, respectively, that serve as flywheel diodes. The inverter circuit 23 is a so-called half-bridge inverter.

The IGBT 23a and the IGBT 23b are subjected to on-off driving by a driving signal outputted from the control unit 45. The control unit 45 outputs an alternately on-off driving signal by bringing the IGBT 23b into an off state while the IGBT 23a is turned on and bringing the IGBT 23b into an on state while the IGBT 23a is turned off. This causes the inverter circuit 23 to convert DC power outputted from the DC power supply circuit 22 into AC power of a high frequency of 20 to 100 kHz and supply the power to a resonant circuit composed of the first heating coil 1a and the resonant capacitor 24a.

The resonant capacitor 24a is connected in series to the first heating coil 1a. The resonant circuit composed of the first heating coil 1a and the resonant capacitor 24a has a resonant frequency that depends on the inductance of the first heating coil 1a and the capacitance of the resonant capacitor 24a. The inductance of the first heating coil 1a changes according to the characteristics of a metal load, when the heating target, which is the metal load, is subjected to magnetic coupling, and the resonant frequency of the resonant circuit changes according to this change in inductance.

When a high-frequency current is supplied to the first heating coil 1a, a heating target placed on the top plate 4 directly above the first heating coil 1a is inductively heated by a high-frequency magnetic flux produced by the high-frequency current flowing through the first heating coil 1a.

The IGBT 23a and the IGBT 23b, which serve as switching elements, are each constituted, for example, by a silicon semiconductor but may alternatively be each constituted by a wide bandgap semiconductor such as silicon carbide or gallium nitride.

Using a wide bandgap semiconductor in a switching element can reduce a conduction loss of the switching element. Further, even in the case of a high driving frequency, that is, high-speed switching, the driver circuit 50 can have a small-sized heat-dissipating fin, as the driver circuit 50a is satisfactory in heat dissipation. This makes it possible to achieve reductions in size and cost of the driver circuit 50a.

Furthermore, the driver circuit 50a includes an input current detection unit 25a and a coil current detection unit 25b. The input current detection unit 25a is constituted, for example, by a current sensor, detects an electric current inputted from the AC power supply 21 to the DC power supply circuit 22, and outputs a voltage signal equivalent to an input current value to the control unit 45. The coil current detection unit 25b is constituted, for example, by a current sensor, detects an electric current flowing through the first heating coil 1a, and outputs a voltage signal equivalent to a coil current value to the control unit 45.

(Operation)

Next, operation of the induction cooker 100 according to Embodiment 1 is described.

When a user places a heating target on the top plate 4 and gives the operation unit 40 an instruction to start heating, the load determination unit 46 of the control unit 45 performs a load determination process.

In the load determination process, the load determination unit 46 determines, for example on the basis of a relationship between a coil current of each of the first to fourth heating coils 1a to 1d and an input current, whether a heating target is placed above each heating coil. Specifically, the load determination unit 46 drives the inverter circuit 23 of each of the driver circuits 50a to 50d with a particular driving signal for use in load determination. The control unit 45 detects an input current from an output signal of the input current detection unit 25a. Further, at the same time, the control unit 45 detects a coil current from an output signal of the coil current detection unit 25b. The load determination unit 46 determines, from the input current thus detected, the coil current thus detected, and a load determination table stored in advance in the memory 48, whether a heating target is placed above each heating coil.

This is not the only method for load determination. The load determination unit 46 needs only be configured to determine whether a heating target is placed above each heating coil. For example, the load determination unit 46 may determine the presence or absence of a heating target by an optical method. Specifically, the load determination unit 46 may determine the presence or absence of a heating target by projecting light upward from below the top plate 4 and detecting reflected light from the heating target.

Next, the control unit 45 controls the driver circuits 50a to 50d according to a result of the load determination process and performs a heating operation of supplying high-frequency power appropriate to induction heating power and the cooking menu.

The following describes, in relation to an operation that is performed in a case where the convector mode has been selected as a cooking menu by an input from the operation unit 40, a case where the size of a heating target placed on the top plate 4 is a small diameter, a case where the size of a heating target placed on the top plate 4 is a medium diameter, and a case where the size of a heating target placed on the top plate 4 is a large diameter.

Note here that the size of a heating target 5a that is placed over two of the first to fourth heating coils 1a to 1d is referred to as "small diameter". Further, the size of a heating target 5b that is placed over three of the first to fourth heating coils 1a to 1d is referred to as "medium diameter". Further, the size of a heating target 5c that is placed over four of the first to fourth heating coils 1a to 1d is referred to as "large diameter". Further, in a case where no distinction is drawn among the heating target 5a, the heating target 5b, and the heating target 5c, they are referred to as "heating target 5".

(Small Diameter)

Figure 6:
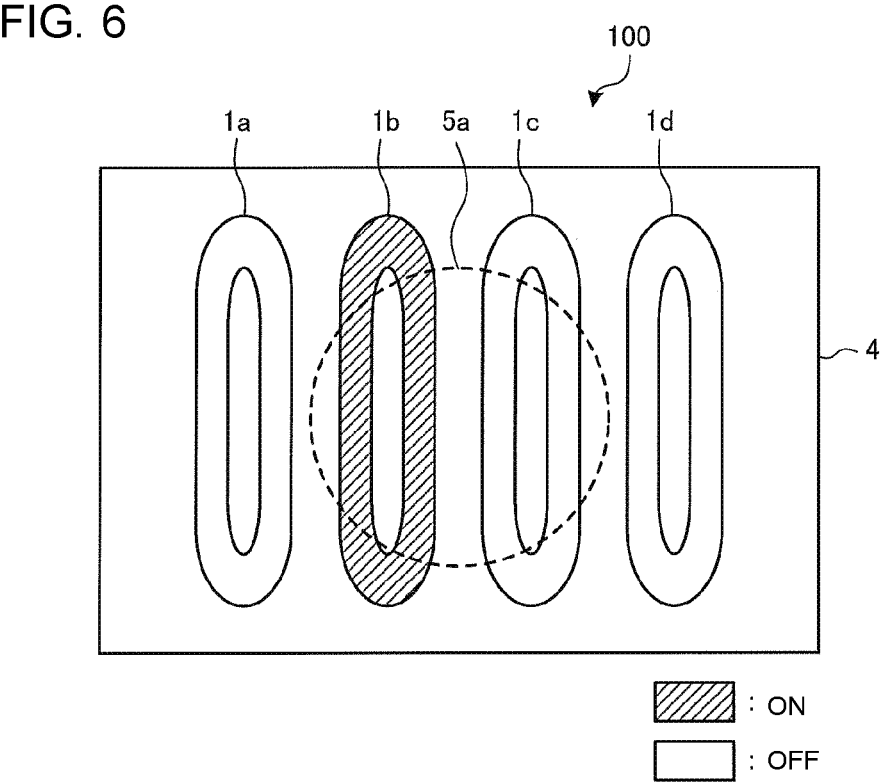
FIG. 6 is a plan view schematically showing a conducting state of the plurality of heating coils of the induction cooker according to Embodiment 1.
Figure 7:
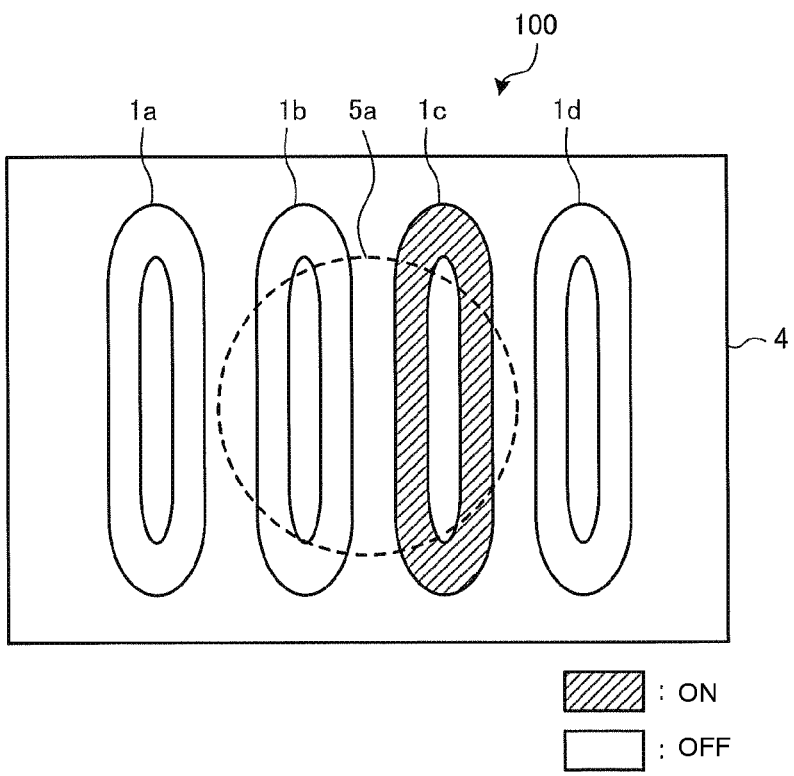
FIG. 7 is a plan view schematically showing a conducting state of the plurality of heating coils of the induction cooker according to Embodiment 1.

FIGS. 6 and 7 are each a plan view schematically showing a conducting state of the plurality of heating coils of the induction cooker according to Embodiment 1.

Figure 8:
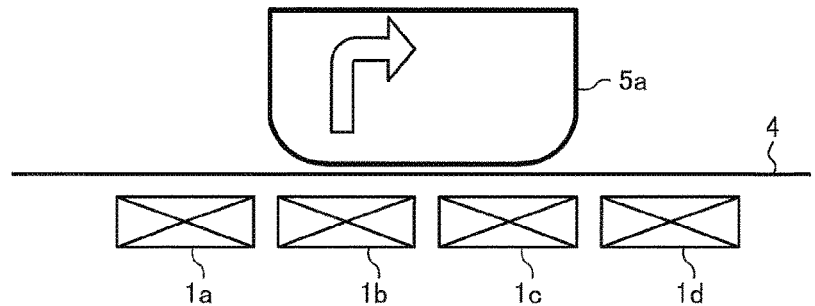
FIG. 8 is a diagram showing the plurality of heating coils of the induction cooker according to Embodiment 1 and a heating target.
Figure 9:
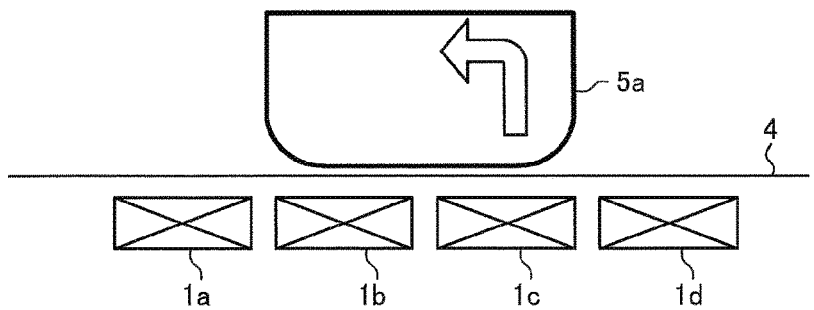
FIG. 9 is a diagram showing the plurality of heating coils of the induction cooker according to Embodiment 1 and the heating target.

FIGS. 8 and 9 are each a diagram showing the plurality of heating coils of the induction cooker according to Embodiment 1 and a heating target.

In each of FIGS. 6 and 7, the solid lines indicate the first to fourth heating coils 1a to 1d disposed below the top plate 4, and the dotted line indicates the heating target 5a placed on the top plate 4.

Further, FIGS. 8 and 9 each schematically show a longitudinal section with the heating target 5a placed on the top plate 4. Further, in FIGS. 8 and 9, the arrows indicate directions of convection having occurred in a liquid cooking target contained in the heating target 5a.

When, as shown in FIGS. 6 and 7, the heating target 5a is placed over the second heating coil 1b and the third heating coil 1c, the control unit 45 alternately switches between the supply of electric power to the second heating coil 1b and the supply of electric power to the third heating coil 1c over time.

That is, when the heating target 5a is placed over adjacent two of the first to fourth heating coils 1a to 1d, the control unit 45 supplies electric power to one of the two heating coils and sequentially changes, over time, the heating coils to which the power is supplied.

Further, the control unit 45 equalizes an amount of electric power represented by the product of electric power that is supplied to the second heating coil 1b and the duration of conduction and an amount of electric power represented by the product of electric power that is supplied to the third heating coil 1c and the duration of conduction. That is, the control unit 45 equalizes the products of electric power that is supplied to adjacent two of the first to fourth heating coils 1a to 1d and the duration of conduction. Note here that the phrase "the same amount of electric power" is not limited to strictly the same value but encompasses errors caused by control errors or other errors and allows for substantially the same amount of electric power. The same applies to the following description.

When, as shown in FIG. 6, electric power is supplied to the second heating coil 1b and the supply of electric power to the third heating coil 1c is stopped, convection such as that shown in FIG. 8 occurs. That is, the liquid cooking target contained in the heating target 5a convects in such a manner that a portion of the liquid cooking target located above the second heating coil 1b is heated, moves upward from a lower part of the heating target 5a, and then moves toward the right as see from the front of the drawing sheet of FIG. 8, that is, toward an area above the third heating coil 1c.

When, as shown in FIG. 7, the supply of electric power to the second heating coil 1b is stopped and electric power is supplied to the third heating coil 1c, convection such as that shown in FIG. 9 occurs. That is, the liquid cooking target contained in the heating target 5a convects in such a manner that a portion of the liquid cooking target located above the third heating coil 1c is heated, moves upward from the lower part of the heating target 5a, and then moves toward the left as see from the front of the drawing sheet of FIG. 9, that is, toward an area above the second heating coil 1b.

In this way, the alternate conduction of electricity through the two adjacent heating coils effects convection in the liquid cooking target, such as broth, contained in the heating target 5a, allowing the liquid cooking target to disperse.

(Medium Diameter)

Figure 10:
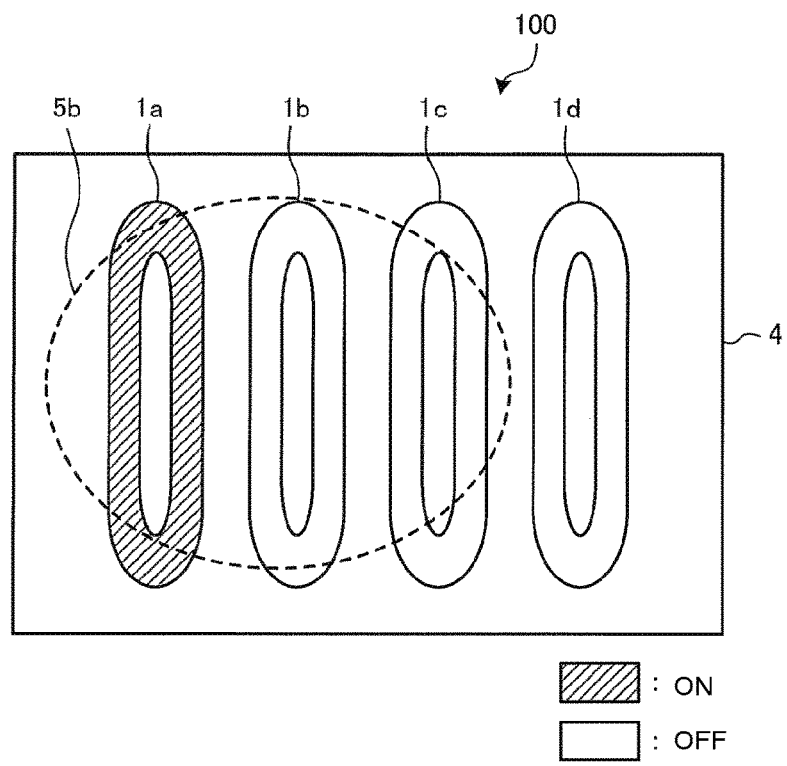
FIG. 10 is a plan view schematically showing a conducting state of the plurality of heating coils of the induction cooker according to Embodiment 1.
Figure 11:
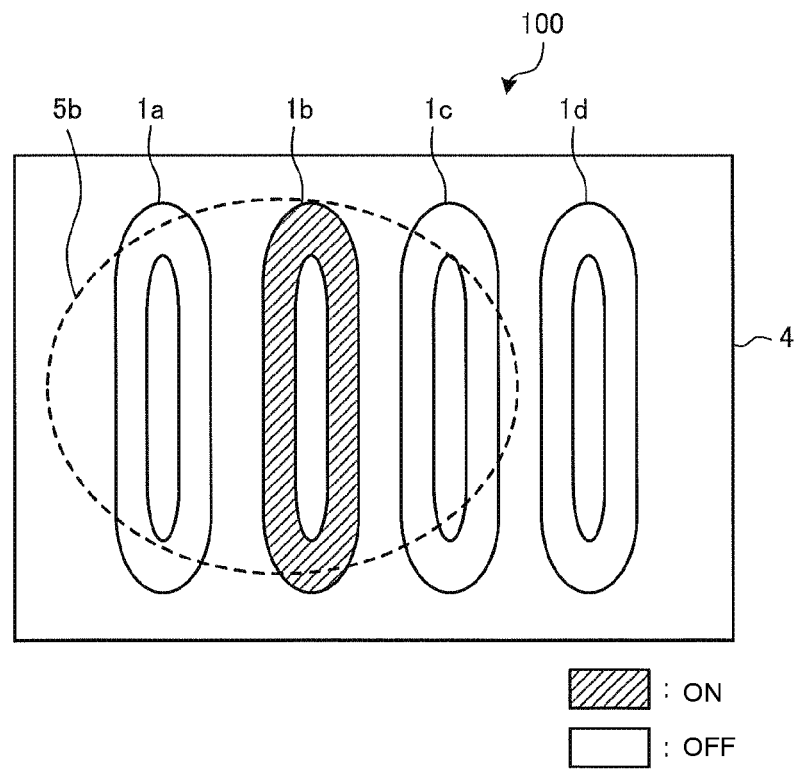
FIG. 11 is a plan view schematically showing a conducting state of the plurality of heating coils of the induction cooker according to Embodiment 1.
Figure 12:
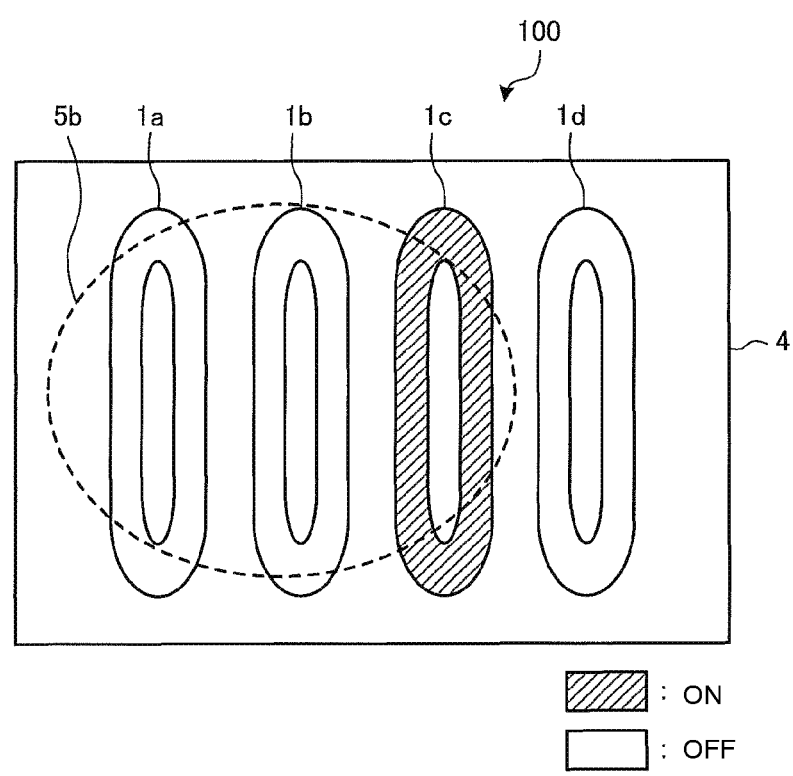
FIG. 12 is a plan view schematically showing a conducting state of the plurality of heating coils of the induction cooker according to Embodiment 1.

FIGS. 10 to 12 are each a plan view schematically showing a conducting state of the plurality of heating coils of the induction cooker according to Embodiment 1.

Figure 13:
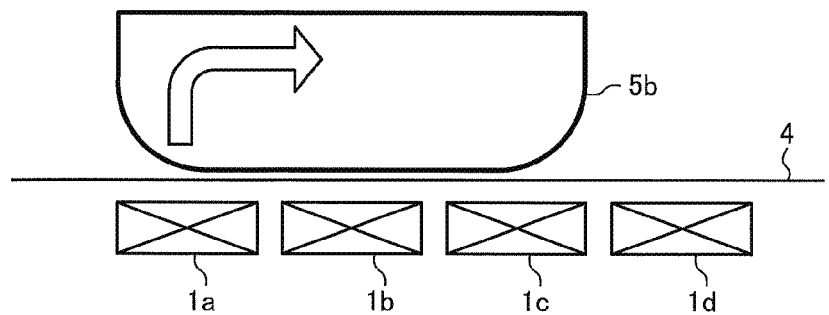
FIG. 13 is a diagram showing the plurality of heating coils of the induction cooker according to Embodiment 1 and a heating target.
Figure 14:
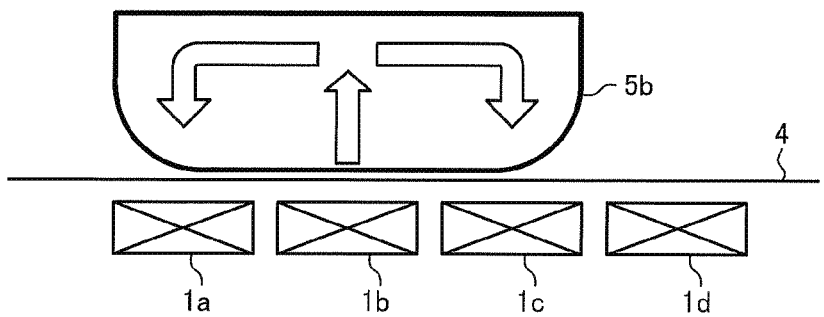
FIG. 14 is a diagram showing the plurality of heating coils of the induction cooker according to Embodiment 1 and the heating target.
Figure 15:
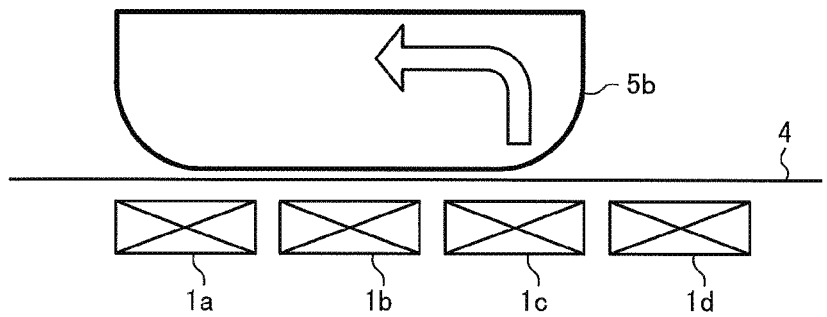
FIG. 15 is a diagram showing the plurality of heating coils of the induction cooker according to Embodiment 1 and the heating target.

FIGS. 13 to 15 are each a diagram showing the plurality of heating coils of the induction cooker according to Embodiment 1 and a heating target.

In each of FIGS. 10 to 12, the solid lines indicate the first to fourth heating coils 1a to 1d disposed below the top plate 4, and the dotted line indicates the heating target 5b placed on the top plate 4.

Further, FIGS. 13 to 15 each schematically show a longitudinal section with the heating target 5b placed on the top plate 4. Further, in FIGS. 13 to 15, the arrows indicate directions of convection having occurred in a liquid cooking target contained in the heating target 5b.

When, as shown in FIGS. 10 to 12, the heating target 5b is placed over the first heating coil 1a, the second heating coil 1b, and the third heating coil 1c, the control unit 45 performs the following operation. The control unit 45 sequentially switches among the supply of electric power to the first heating coil 1a, the supply of electric power to the second heating coil 1b, and the supply of electric power to the third heating coil 1c over time.

That is, when the heating target 5b is placed over adjacent three of the first to fourth heating coils 1a to 1d, the control unit 45 supplies electric power to one of the three adjacent heating coils and sequentially changes, over time, the heating coils to which the power is supplied.

Further, the control unit 45 equalizes amounts of electric power that are the products of electric power that is supplied to the first heating coil 1a, the second heating coil 1b, and the third heating coil 1c and the duration of conduction. That is, the control unit 45 equalizes the products of electric power that is supplied to adjacent three of the first to fourth heating coils 1a to 1d and the duration of conduction.

When, as shown in FIG. 10, electric power is supplied to the first heating coil 1a and the supply of electric power to the second heating coil 1b and the third heating coil 1c is stopped, convection such as that shown in FIG. 13 occurs. That is, the liquid cooking target contained in the heating target 5b convects in such a manner that a portion of the liquid cooking target located above the first heating coil 1a is heated, moves upward from a lower part of the heating target 5b, and then moves toward the right as see from the front of the drawing sheet of FIG. 13, that is, toward an area above the second heating coil 1b.

When, as shown in FIG. 11, electric power is supplied to the second heating coil 1b and the supply of electric power to the first heating coil 1a and the third heating coil 1c is stopped, convection such as that shown in FIG. 14 occurs. That is, the liquid cooking target contained in the heating target 5b convects in such a manner that a portion of the liquid cooking target located above the second heating coil 1b is heated, moves upward from the lower part of the heating target 5b, and then moves toward the left as see from the front of the drawing sheet of FIG. 14, that is, toward an area above the first heating coil 1a, and toward the right as see from the front of the drawing sheet of FIG. 14, that is, toward an area above the third heating coil 1c.

When, as shown in FIG. 12, electric power is supplied to the third heating coil 1c and the supply of electric power to the first heating coil 1a and the second heating coil 1b is stopped, convection such as that shown in FIG. 15 occurs. That is, the liquid cooking target contained in the heating target 5b convects in such a manner that a portion of the liquid cooking target located above the third heating coil 1c is heated, moves upward from the lower part of the heating target 5b, and then moves toward the left as see from the front of the drawing sheet of FIG. 15, that is, toward an area above the second heating coil 1b.

In this way, the sequential switching of the supply of electric power to the three adjacent heating coils effects convection in the liquid cooking target, such as broth, contained in the heating target 5b, allowing the liquid cooking target to disperse.

The order in which electric power is supplied to the three adjacent heating coils is not limited to the order of the first heating coil 1a, the second heating coil 1b, and the third heating coil 1c, but may be any order.

(Large Diameter)

FIGS. 16 to 19 are each a plan view schematically showing a conducting state of the plurality of heating coils of the induction cooker according to Embodiment 1.

FIGS. 20 to 23 are each a diagram showing the plurality of heating coils of the induction cooker according to Embodiment 1 and a heating target.

In each of FIGS. 16 to 19, the solid lines indicate the first to fourth heating coils 1a to 1d disposed below the top plate 4, and the dotted line indicates the heating target 5c placed on the top plate 4.

Further, FIGS. 20 to 23 each schematically show a longitudinal section with the heating target 5c placed on the top plate 4. Further, in FIGS. 20 to 23, the arrows indicate directions of convection having occurred in a liquid cooking target contained in the heating target 5c.

When, as shown in FIGS. 16 to 19, the heating target 5c is placed over the first heating coil 1a, the second heating coil 1b, the third heating coil 1c, and the fourth heating coil 1d, the control unit 45 performs the following operation. The control unit 45 sequentially switches among the supply of electric power to the first heating coil 1a, the supply of electric power to the second heating coil 1b, the supply of electric power to the third heating coil 1c, and the supply of electric power to the fourth heating coil 1d over time.

That is, when the heating target 5c is placed over adjacent four of the first to fourth heating coils 1a to 1d, the control unit 45 supplies electric power to one of the four heating coils and sequentially changes, over time, the heating coils to which the power is supplied.

Further, the control unit 45 equalizes amounts of electric power that are the products of electric power that is supplied to the first heating coil 1a, the second heating coil 1b, the third heating coil 1c, and the fourth heating coil 1d and the duration of conduction. That is, the control unit 45 equalizes the products of electric power that is supplied to the first to fourth heating coils 1a to 1d and the duration of conduction.

Figure 16:
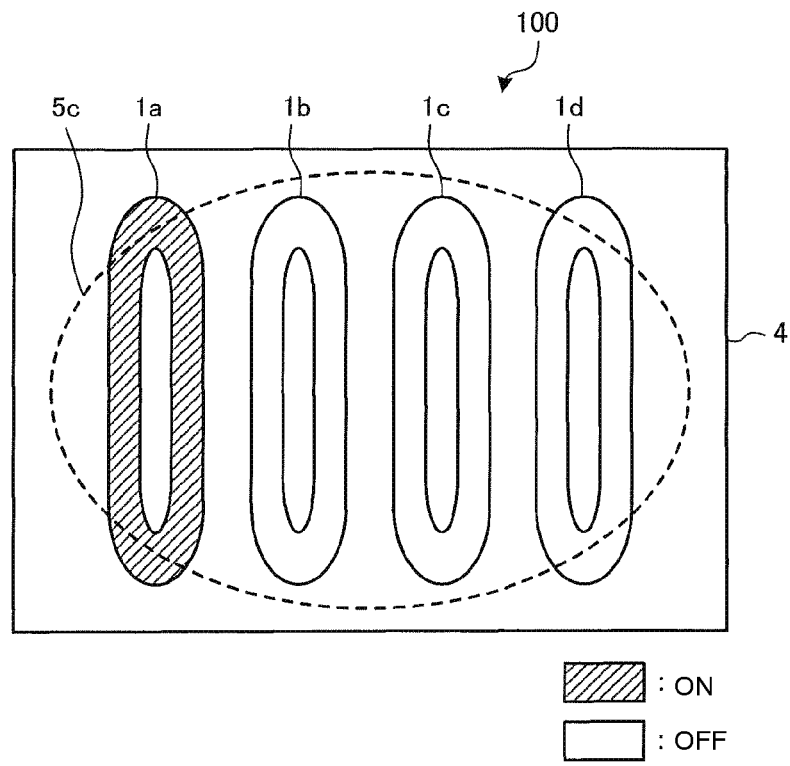
FIG. 16 is a plan view schematically showing a conducting state of the plurality of heating coils of the induction cooker according to Embodiment 1.
Figure 20:
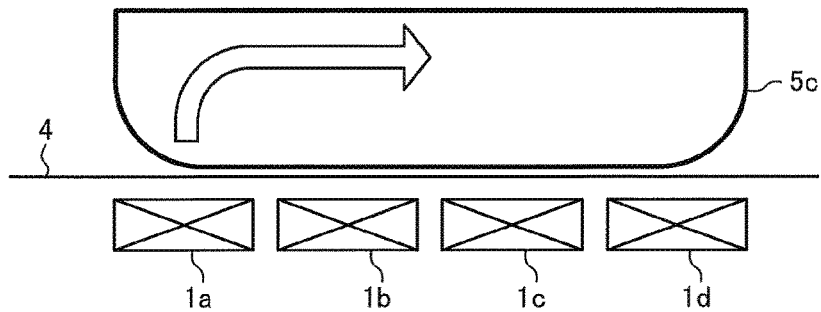
FIG. 20 is a diagram showing the plurality of heating coils of the induction cooker according to Embodiment 1 and a heating target.

When, as shown in FIG. 16, electric power is supplied to the first heating coil 1a and the supply of electric power to the second to fourth heating coils 1b to 1d is stopped, convection such as that shown in FIG. 20 occurs. That is, the liquid cooking target contained in the heating target 5c convects in such a manner that a portion of the liquid cooking target located above the first heating coil 1a is heated, moves upward from a lower part of the heating target 5c, and then moves toward the right as see from the front of the drawing sheet of FIG. 20, that is, toward an area above the second heating coil 1b.

Figure 17:
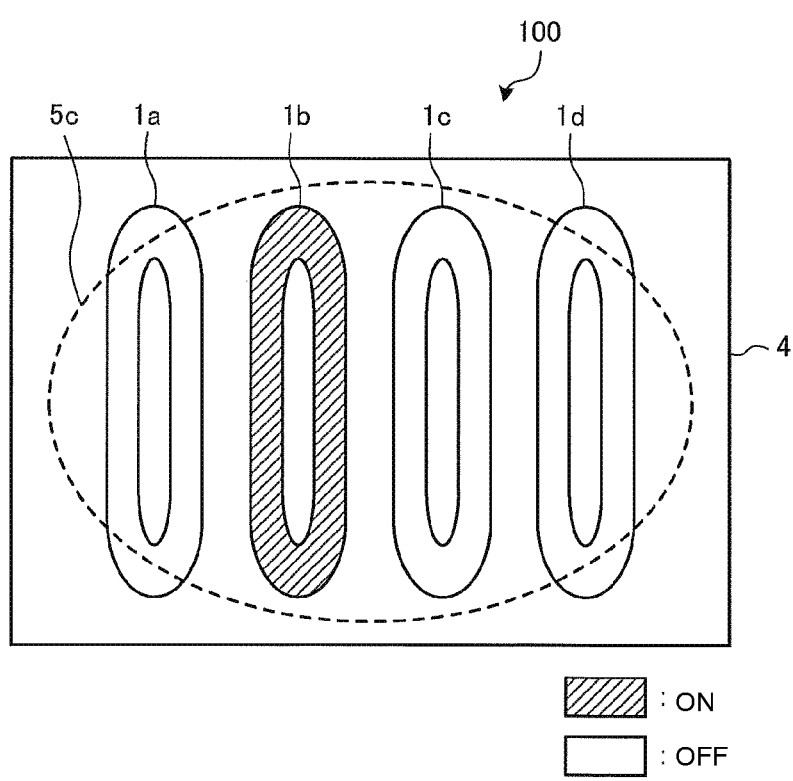
FIG. 17 is a plan view schematically showing a conducting state of the plurality of heating coils of the induction cooker according to Embodiment 1.
Figure 21:
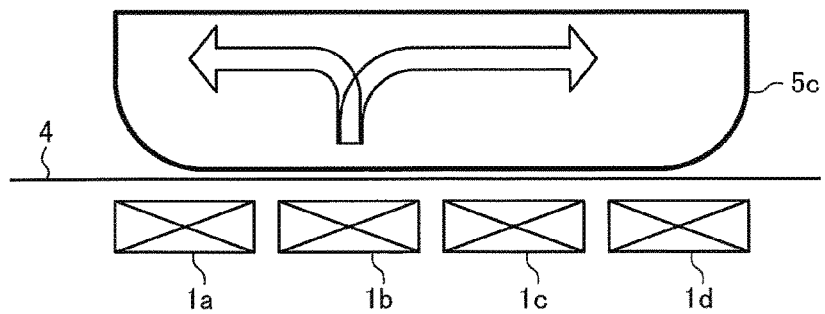
FIG. 21 is a diagram showing the plurality of heating coils of the induction cooker according to Embodiment 1 and the heating target.

When, as shown in FIG. 17, electric power is supplied to the second heating coil 1b and the supply of electric power to the first heating coil 1a, the third heating coil 1c, and the fourth heating coil 1d is stopped, convection such as that shown in FIG. 21 occurs. That is, the liquid cooking target contained in the heating target 5c convects in such a manner that a portion of the liquid cooking target located above the second heating coil 1b is heated, moves upward from the lower part of the heating target 5c, and then moves toward the left as see from the front of the drawing sheet of FIG. 21, that is, toward an area above the first heating coil 1a, and toward the right as see from the front of the drawing sheet of FIG. 21, that is, toward an area above the third heating coil 1c.

Figure 18:
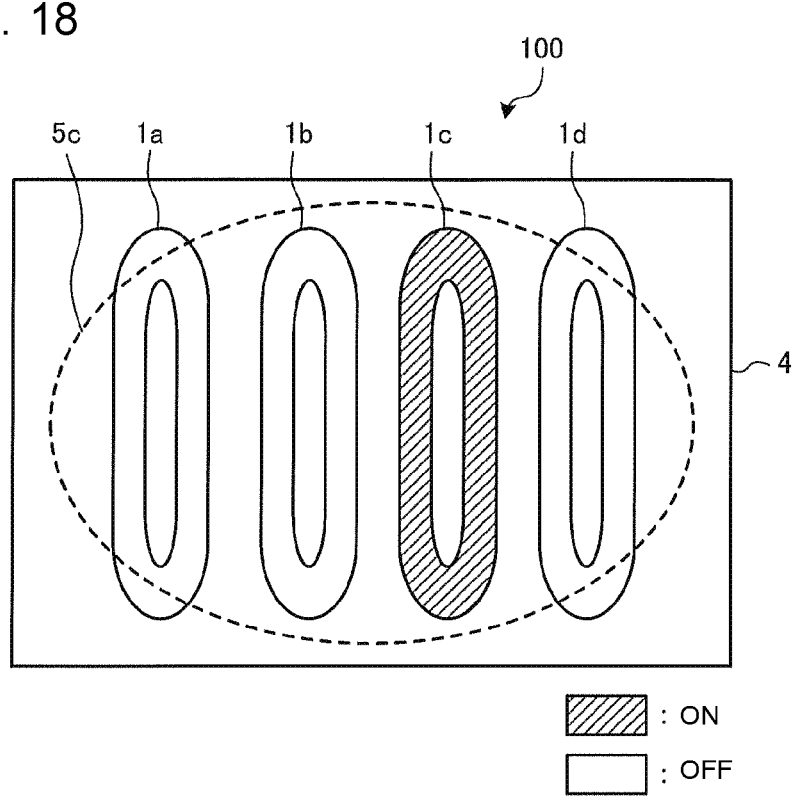
FIG. 18 is a plan view schematically showing a conducting state of the plurality of heating coils of the induction cooker according to Embodiment 1.
Figure 22:
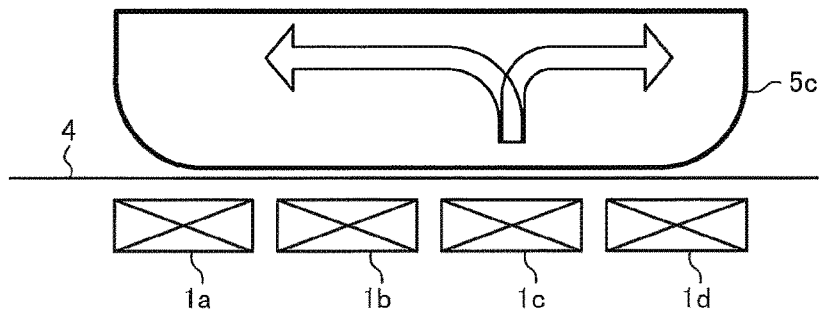
FIG. 22 is a diagram showing the plurality of heating coils of the induction cooker according to Embodiment 1 and the heating target.

When, as shown in FIG. 18, electric power is supplied to the third heating coil 1c and the supply of electric power to the first heating coil 1a, the second heating coil 1b, and the fourth heating coil 1c is stopped, convection such as that shown in FIG. 22 occurs. That is, the liquid cooking target contained in the heating target 5c convects in such a manner that a portion of the liquid cooking target located above the third heating coil 1c is heated, moves upward from the lower part of the heating target 5c, and then moves toward the left as see from the front of the drawing sheet of FIG. 22, that is, toward an area above the second heating coil 1b, and toward the right as see from the front of the drawing sheet of FIG. 22, that is, toward an area above the fourth heating coil 1d.

Figure 19:
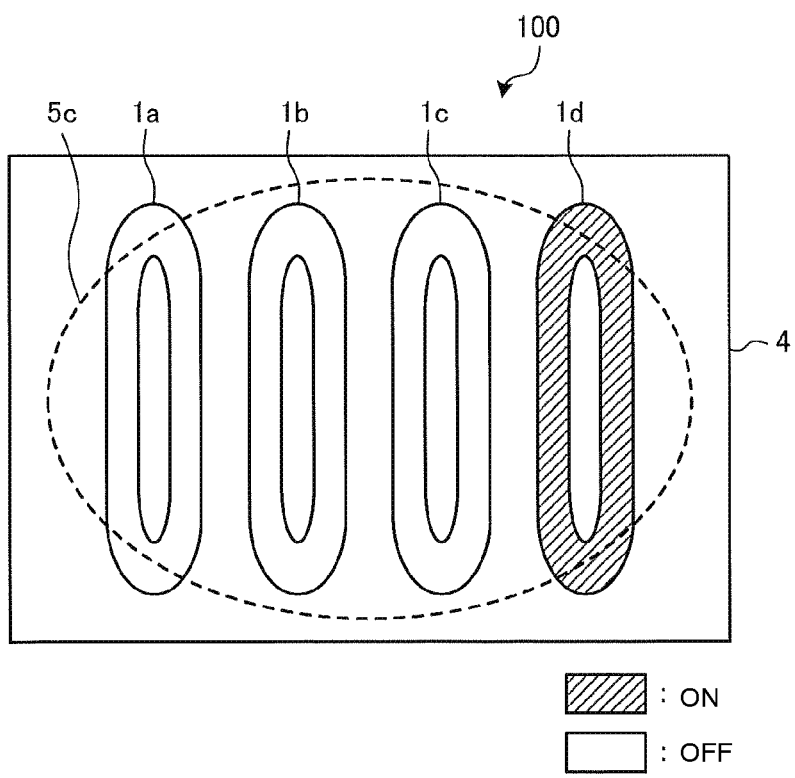
FIG. 19 is a plan view schematically showing a conducting state of the plurality of heating coils of the induction cooker according to Embodiment 1.
Figure 23:
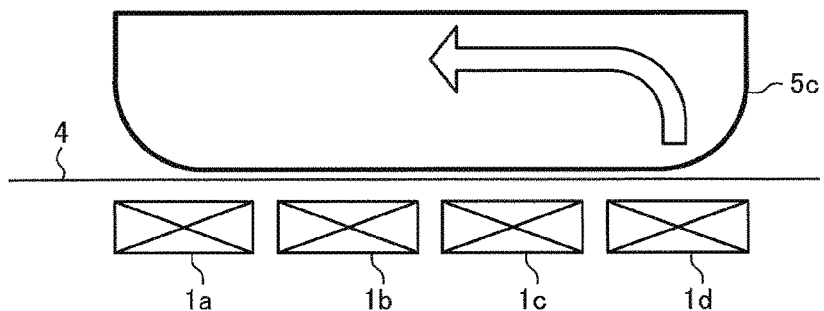
FIG. 23 is a diagram showing the plurality of heating coils of the induction cooker according to Embodiment 1 and the heating target.

When, as shown in FIG. 19, electric power is supplied to the fourth heating coil 1d and the supply of electric power to the first to third heating coils 1a to 1c is stopped, convection such as that shown in FIG. 23 occurs. That is, the liquid cooking target contained in the heating target 5c convects in such a manner that a portion of the liquid cooking target located above the fourth heating coil 1d is heated, moves upward from the lower part of the heating target 5c, and then moves toward the left as see from the front of the drawing sheet of FIG. 23, that is, toward an area above the third heating coil 1c.

In this way, the sequential switching of the supply of electric power to the four adjacent heating coils effects convection in the liquid cooking target, such as broth, contained in the heating target 5c, allowing the liquid cooking target to disperse.

The order in which electric power is supplied to the four adjacent heating coils is not limited to the order of the first heating coil 1a, the second heating coil 1b, the third heating coil 1c, and the fourth heating coil 1d, but may be any order.

Although, in any of the aforementioned small-diameter, medium-diameter, and large-diameter heating operations, electric power is supplied to at least one, but not all, of the two or more heating coils over which the heating target 5 is placed and the supply of electric power to one or more, but not all, other ones of the two or more heating coils is stopped, this is not intended to impose any limitation on the present invention. For example, the control unit 45 may supply more electric power to at least one, but not all, of the two or more adjacent heating coils than to one or more, but not all, other ones of the two or more adjacent heating coils and change, over time, the heating coils to which the more power is supplied.

Effects

As noted above, in Embodiment 1, when the heating target 5 is placed over adjacent two or more of the first to fourth heating coils 1a to 1d, the control unit 45 supplies electric power to at least one of the adjacent two or more heating coils and changes, over time, the heating coils to which the power is supplied.

This makes it possible to promote convection in the liquid cooking target contained in the heating target 5 and reduce nonuniformity in temperature of the cooking target and scorching of the cooking target. That is, this brings about an effect of eliminating unevenness in flavor and improving flavor penetration by dispersing the broth in cooking a boiled dish or other dishes.

Further, cooking with heat is performed by those ones of the first to fourth heating coils 1a to 1d over which the heating target 5 is placed. This makes it possible to handle heating targets 5 whose sizes vary from small to large in diameter and brings about improvement in user-friendliness.

Further, in Embodiment 1, electric power is supplied to one of the two or more heating coils over which the heating target 5 is placed, and the heating coils to which the power is supplied are sequentially changed over time.

For this reason, heated portions of the heating target 5 are changed over time, so that the liquid cooking target contained in the heating target 5 can be warmed or kept warm with reduced scorching.

Further, in Embodiment 1, the control unit 45 equalizes the products of electric power that is supplied to adjacent two or more of the first to fourth heating coils 1a to 1d and the duration of conduction.

This makes it possible to reduce nonuniformity in heating temperature of the heating target 5 and reduce nonuniformity in temperature of the cooking target.

Further, in Embodiment 1, the first to fourth heating coils 1a to 1d have the same shape and the same size as one another.

This causes each heating coil to have the same area in plan view and makes it possible to reduce nonuniformity in heating temperature of the heating target 5.

Further, in Embodiment 1, the first to fourth heating coils 1a to 1d are aligned so that the spacing L2 between adjacent two of the first to fourth heating coils 1a to 1d is shorter than a half of the length L1 of the minor axis of each of the first to fourth heating coils 1a to 1d.

This makes it possible to reduce a drop in temperature of the heating target 5 between the two heating coils and reduce nonuniformity in heating temperature.

Although the foregoing description has dealt with an operation in the convector mode, which causes convection in a liquid cooking target contained in a heating target 5, the aforementioned heating operation may also be applied to a cooking mode of heating a heating target 5, such as a frying pan or an iron plate, on which a solid cooking target is placed.

Since heated portions of the heating target 5, such as a frying pan or an iron plate, are changed over time, the solid cooking target placed on the heating target 5 can be heated or kept warm with reduced scorching.

(Modifications)

The foregoing description has dealt with the operation in which the control unit 45 equalizes the products of electric power that is supplied to adjacent three or more of the first to fourth heating coils 1a to 1d and the duration of conduction. An outer peripheral part of the heating target 5 is larger in heat transfer amount than a central part of the heating target 5. For this reason, the outer peripheral part of the heating target 5 may be more likely to become lower in temperature than the central part of the heating target 5. For this reason, the following operation may be performed instead of the foregoing operation.

When the heating target 5 is placed over adjacent three or more of the first to fourth heating coils 1a to 1d, the control unit 45 performs the following operation. The control unit 45 makes the product of electric power that is supplied to outside two or more of the three or more adjacent heating coils and the duration of conduction larger than the product of electric power that is supplied to inside one or more of the three or more adjacent heating coils and the duration of conduction, the inside being the direction to center of the plane on which the coils are aligned.

For example, when the medium-diameter heating target 5b is placed over the first heating coil 1a, the second heating coil 1b, and the third heating coil 1c, the control unit 45 performs the following operation. The control unit 45 makes an amount of electric power represented by the product of electric power that is supplied to the first heating coil 1a and the third heating coil 1c and the duration of conduction larger than an amount of electric power represented by the product of electric power that is supplied to the second heating coil 1b and the duration of conduction.

Further, for example, when the large-diameter heating target 5c is placed over the first heating coil 1a, the second heating coil 1b, the third heating coil 1c, and the fourth heating coil 1d, the control unit 45 performs the following operation. The control unit 45 makes an amount of electric power represented by the product of electric power that is supplied to the first heating coil 1a and the fourth heating coil 1d and the duration of conduction larger than an amount of electric power represented by the product of electric power that is supplied to the second heating coil 1b and the third heating coil 1c and the duration of conduction.

This operation can make the outer peripheral part of the heating target 5 larger in heat transfer amount than the central part of the heating target 5 and makes it possible to reduce nonuniformity in heating temperature of the heating target 5. This makes it possible to reduce nonuniformity in temperature of the cooking target and scorching of the cooking target.

Embodiment 2

The following describes operation of an induction cooker 100 according to Embodiment 2 with a focus on differences from Embodiment 1. The induction cooker 100 according to Embodiment 2 is the same in configuration as that of Embodiment 1. Components that are the same as those of Embodiment 1 are given the same reference signs, and a description of such components is omitted.

(Operation)

As in the case of Embodiment 1, when a user places a heating target 5 on the top plate 4 and gives the operation unit 40 an instruction to start heating, the load determination unit 46 of the control unit 45 performs a load determination process. The control unit 45 controls the driver circuits 50a to 50d according to a result of the load determination process and performs a heating operation appropriate to induction heating power and the cooking menu.

The following describes, in relation to an operation that is performed in a case where the convector mode has been selected as a cooking menu by an input from the operation unit 40, a case where the size of a heating target placed on the top plate 4 is a medium diameter and a case where the size of a heating target placed on the top plate 4 is a large diameter.

(Medium Diameter)

Figure 24:
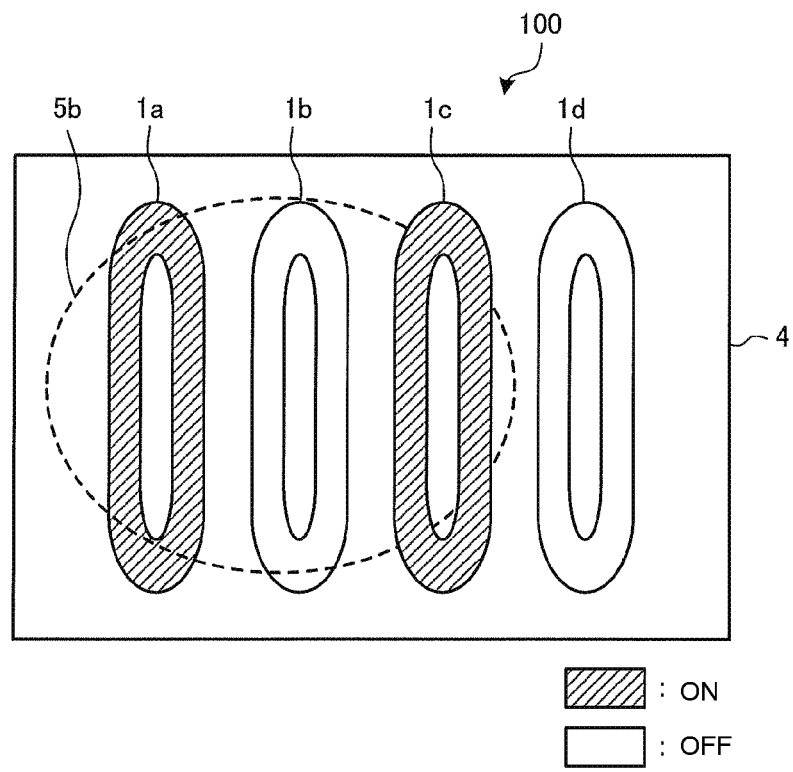
FIG. 24 is a plan view schematically showing a conducting state of a plurality of heating coils of an induction cooker according to Embodiment 2.
Figure 25:
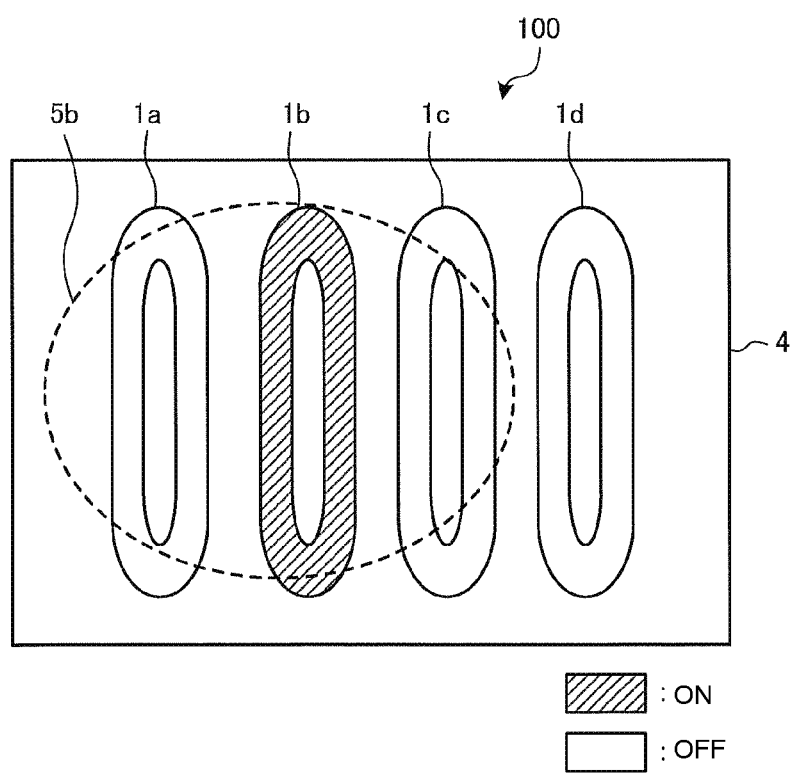
FIG. 25 is a plan view schematically showing a conducting state of the plurality of heating coils of the induction cooker according to Embodiment 2.

FIGS. 24 and 25 are each a plan view schematically showing a conducting state of the plurality of heating coils of the induction cooker according to Embodiment 2.

Figure 26:
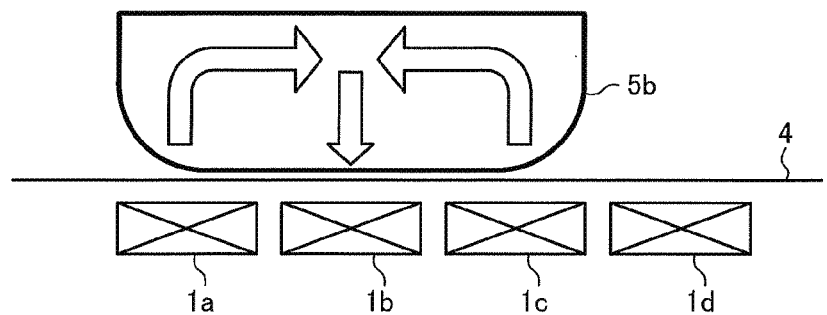
FIG. 26 is a diagram showing the plurality of heating coils of the induction cooker according to Embodiment 2 and a heating target.
Figure 27:
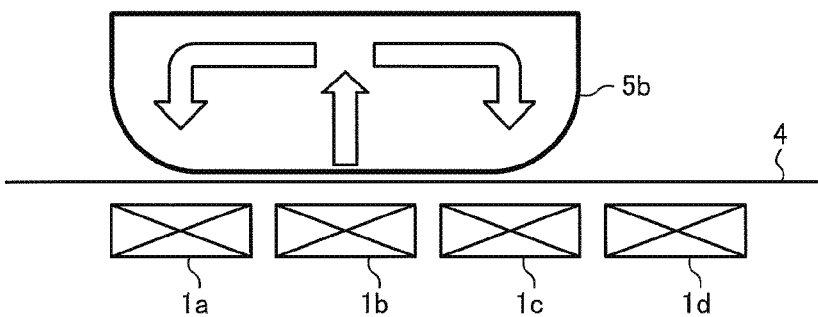
FIG. 27 is a diagram showing the plurality of heating coils of the induction cooker according to Embodiment 2 and the heating target.

FIGS. 26 and 27 are each a diagram showing the plurality of heating coils of the induction cooker according to Embodiment 2 and a heating target.

In each of FIGS. 24 and 25, the solid lines indicate the first to fourth heating coils $1a$ to $1d$ disposed below the top plate 4, and the dotted line indicates the heating target $5b$ placed on the top plate 4.

Further, FIGS. 26 and 27 each schematically show a longitudinal section with the heating target $5b$ placed on the top plate 4. Further, in FIGS. 26 and 27, the arrows indicate directions of convection having occurred in a liquid cooking target contained in the heating target $5b$.

When, as shown in FIGS. 24 and 25, the heating target $5b$ is placed over the first heating coil $1a$, the second heating coil $1b$, and the third heating coil $1c$, the control unit 45 performs the following operation. The control unit 45 alternately switches between the supply of electric power to the first heating coil $1a$ and the third heating coil $1c$ and the supply of electric power to the second heating coil $1b$.

That is, when the heating target $5b$ is placed over adjacent three of the first to fourth heating coils $1a$ to $1d$, the control unit 45 alternately switches between the supply of electric power to inside one of the three heating coils and the supply of electric power to outside two of the three heating coils.

Further, the control unit 45 equalizes an amount of electric power represented by the product of a total of electric power that is supplied to the first heating coil $1a$ and the third heating coil $1c$ and the duration of conduction and an amount of electric power represented by the product of electric power that is supplied to the second heating coil $1b$ and the duration of conduction.

When, as shown in FIG. 24, electric power is supplied to the first heating coil $1a$ and the third heating coil $1c$ and the supply of electric power to the second heating coil $1b$ is stopped, convection such as that shown in FIG. 26 occurs. That is, the liquid cooking target contained in the heating target $5b$ convects in such a manner that a portion of the liquid cooking target located above the first heating coil $1a$ is heated, moves upward from a lower part of the heating target $5b$, and then moves toward the right as see from the front of the drawing sheet of FIG. 26, that is, toward an area above the second heating coil $1b$. At the same time, the liquid cooking target contained in the heating target $5b$ convects in such a manner that a portion of the liquid cooking target located above the third heating coil $1c$ is heated, moves upward from the lower part of the heating target $5b$, and then moves toward the left as see from the front of the drawing sheet of FIG. 26, that is, toward an area above the second heating coil $1b$. Moreover, the liquid cooking target contained in the heating target $5b$ convects in such a manner as to move downward in a central part of the heating target $5b$.

When, as shown in FIG. 25, electric power is supplied to the second heating coil $1b$ and the supply of electric power to the first heating coil $1a$ and the third heating coil $1c$ is stopped, convection such as that shown in FIG. 27 occurs. That is, the liquid cooking target contained in the heating target $5b$ convects in such a manner that a portion of the liquid cooking target located above the second heating coil $1b$ is heated, moves upward from the lower part of the heating target $5b$, and then moves toward the left as see from the front of the drawing sheet of FIG. 27, that is, toward an area above the first heating coil $1a$, and toward the right as see from the front of the drawing sheet of FIG. 27, that is, toward an area above the third heating coil $1c$.

In this way, the alternate switching between the supply of electric power to inside one of the three adjacent heating coils and the supply of electric power to outside two of the three adjacent heating coils effects convection in the liquid cooking target, such as broth, contained in the heating target $5b$, allowing the liquid cooking target to disperse.

(Large Diameter)

Figure 28:
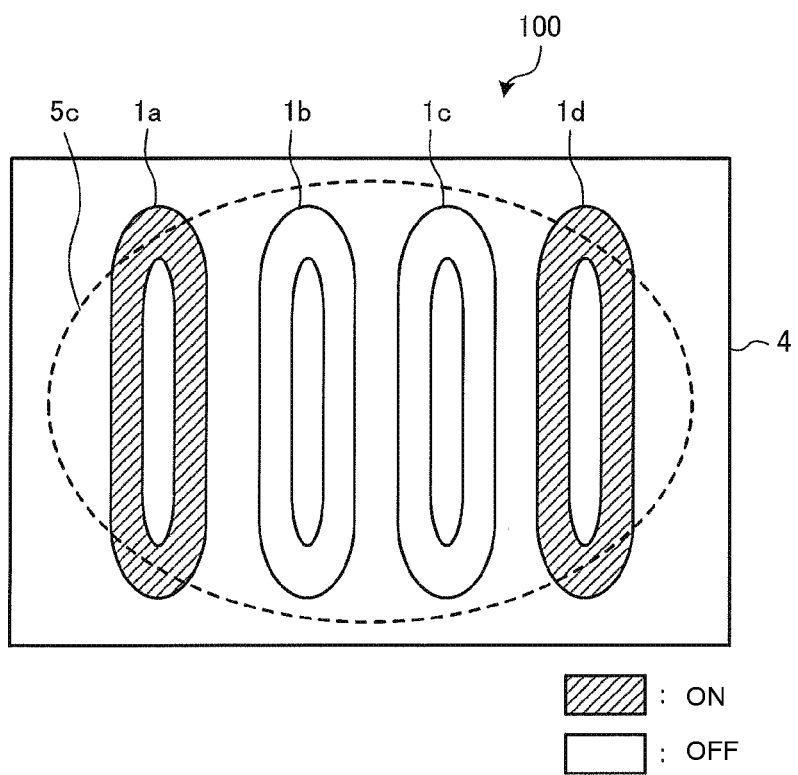
FIG. 28 is a plan view schematically showing a conducting state of the plurality of heating coils of the induction cooker according to Embodiment 2.
Figure 29:
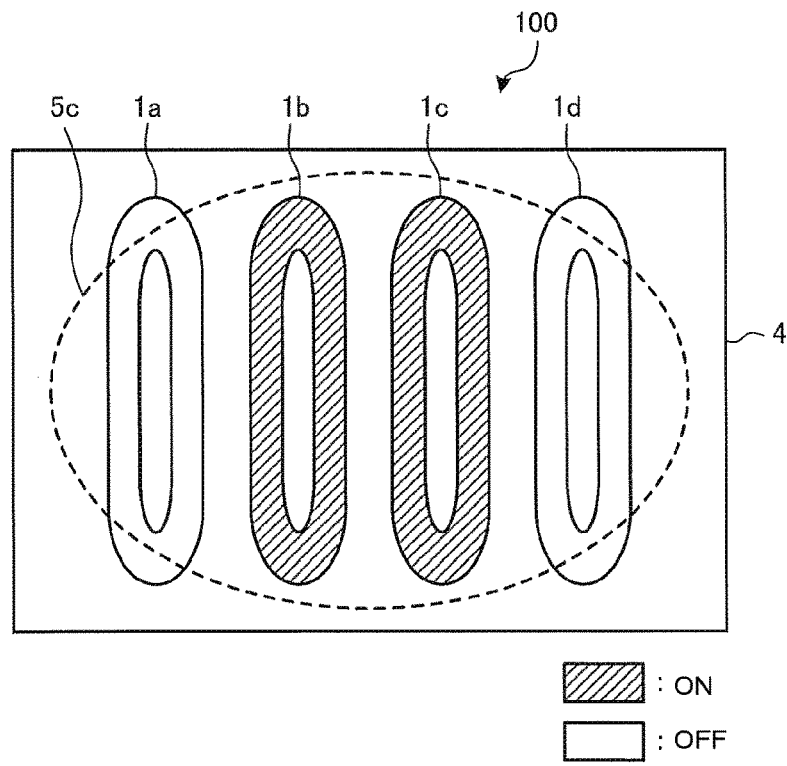
FIG. 29 is a plan view schematically showing a conducting state of the plurality of heating coils of the induction cooker according to Embodiment 2.

FIGS. 28 and 29 are each a plan view schematically showing a conducting state of the plurality of heating coils of the induction cooker according to Embodiment 2.

Figure 30:
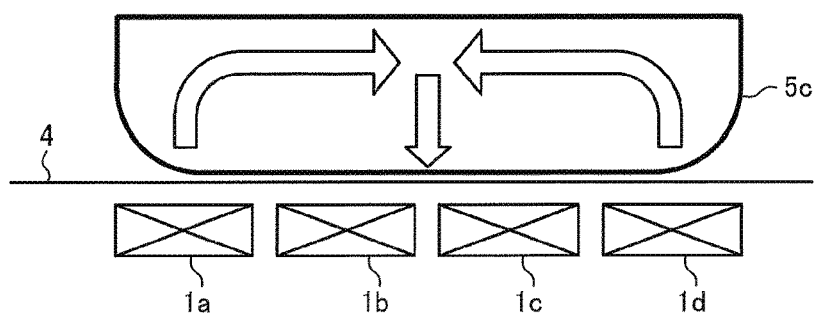
FIG. 30 is a diagram showing the plurality of heating coils of the induction cooker according to Embodiment 2 and a heating target.
Figure 31:
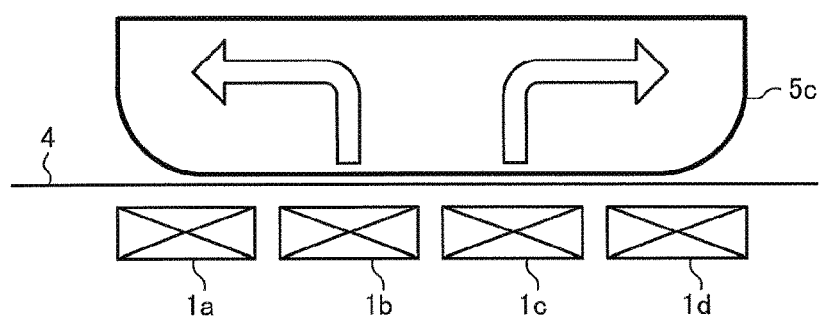
FIG. 31 is a diagram showing the plurality of heating coils of the induction cooker according to Embodiment 2 and the heating target.

FIGS. 30 and 31 are each a diagram showing the plurality of heating coils of the induction cooker according to Embodiment 2 and a heating target.

In each of FIGS. 28 and 29, the solid lines indicate the first to fourth heating coils $1a$ to $1d$ disposed below the top plate 4, and the dotted line indicates the heating target $5c$ placed on the top plate 4.

Further, FIGS. 30 and 31 each schematically show a longitudinal section with the heating target $5c$ placed on the top plate 4. Further, in FIGS. 30 and 31, the arrows indicate directions of convection having occurred in a liquid cooking target contained in the heating target $5c$.

When, as shown in FIGS. 28 and 29, the heating target $5c$ is placed over the first heating coil $1a$, the second heating coil $1b$, the third heating coil $1c$, and the fourth heating coil $1d$, the control unit 45 performs the following operation. The control unit 45 alternately switches between the supply of electric power to the first heating coil $1a$ and the fourth heating coil $1d$ and the supply of electric power to the second heating coil $1b$ and the third heating coil $1c$.

That is, when the heating target $5c$ is placed over four adjacent heating coils, the control unit 45 alternately switches between the supply of electric power to inside two of the four adjacent heating coils and the supply of electric power to outside two of the four adjacent heating coils.

Further, the control unit 45 equalizes an amount of electric power represented by the product of a total of electric power that is supplied to the first heating coil $1a$ and the fourth heating coil $1d$ and the duration of conduction and an amount of electric power represented by the product of a total of electric power that is supplied to the second heating coil $1b$ and the third heating coil $1c$ and the duration of conduction.

When, as shown in FIG. 28, electric power is supplied to the first heating coil $1a$ and the fourth heating coil $1d$ and the supply of electric power to the second heating coil $1b$ and the third heating coil $1c$ is stopped, convection such as that shown in FIG. 30 occurs. That is, the liquid cooking target contained in the heating target $5c$ convects in such a manner that a portion of the liquid cooking target located above the first heating coil $1a$ is heated, moves upward from a lower part of the heating target $5c$, and then moves toward the right as see from the front of the drawing sheet of FIG. 30, that is, toward an area above the second heating coil $1b$. At the same time, the liquid cooking target contained in the heating target $5c$ convects in such a manner that a portion of the liquid cooking target located above the fourth heating coil $1d$ is heated, moves upward from the lower part of the heating target $5c$, and then moves toward the left as see from the front of the drawing sheet of FIG. 30, that is, toward an area above the third heating coil $1c$. Moreover, the liquid cooking target contained in the heating target $5c$ convects in such a manner as to move downward in a central part of the heating target $5c$.

When, as shown in FIG. 28, electric power is supplied to the second heating coil 1b and the third heating coil 1c and the supply of electric power to the first heating coil 1a and the fourth heating coil 1d is stopped, convection such as that shown in FIG. 31 occurs. That is, the liquid cooking target contained in the heating target 5c convects in such a manner that a portion of the liquid cooking target located above the second heating coil 1b is heated, moves upward from the lower part of the heating target 5c, and then moves toward the left as see from the front of the drawing sheet of FIG. 31, that is, toward an area above the first heating coil 1a. At the same time, the liquid cooking target contained in the heating target 5c convects in such a manner that a portion of the liquid cooking target located above the third heating coil 1c is heated, moves upward from the lower part of the heating target 5c, and then moves toward the right as see from the front of the drawing sheet of FIG. 31, that is, toward an area above the fourth heating coil 1d.

In this way, the alternate switching between the supply of electric power to inside two of the four adjacent heating coils and the supply of electric power to outside two of the four adjacent heating coils effects convection in the liquid cooking target, such as broth, contained in the heating target 5b, allowing the liquid cooking target to disperse.

Although, in either of the aforementioned medium-diameter and large-diameter heating operations, electric power is supplied to at least one of the three or more heating coils over which the heating target 5 is placed and the supply of electric power to one or more other ones of the three or more heating coils is stopped, this is not intended to impose any limitation on the present invention. For example, the control unit 45 may supply more electric power to at least one of the three or more adjacent heating coils than to one or more other ones of the three or more adjacent heating coils.

Effects

As noted above, in Embodiment 2, when the heating target 5 is placed over adjacent three or more of the first to fourth heating coils 1a to 1d, the control unit 45 alternately switches between the supply of electric power to inside one or more of the three or more adjacent heating coils and the supply of electric power to outside two or more of the three or more adjacent heating coils.

This makes it possible to alternately produce convection from an outer peripheral part to a central part of the heating target 5 and convection from the central part to the outer peripheral part of the heating target 5, bringing about an effect of eliminating unevenness in flavor and improving flavor penetration by dispersing the broth in cooking a boiled dish or other dishes. Further, heated portions of the heating target 5 are changed over time, so that the liquid cooking target contained in the heating target 5 can be warmed or kept warm with reduced scorching.

Further, in Embodiment 2, the control unit 45 equalizes the products of electric power that is supplied to adjacent three or more of the first to fourth heating coils 1a to 1d and the duration of conduction. This makes it possible to reduce nonuniformity in heating temperature of the heating target 5 and reduce nonuniformity in temperature of the cooking target.

Although the foregoing description has dealt with an operation in the convector mode, which causes convection in a liquid cooking target contained in a heating target 5, the aforementioned heating operation may also be applied to a cooking mode of heating a heating target 5, such as a frying pan or an iron plate, on which a solid cooking target is placed.

Since heated portions of the heating target 5, such as a frying pan or an iron plate, are changed over time, the solid cooking target placed on the heating target 5 can be heated or kept warm with reduced scorching.

A heating operation of the induction cooker 100 according to Embodiment 2 and a heating operation of the induction cooker 100 according to Embodiment 1 may be combined with each other. For example, the control unit 45 may alternately perform a heating operation of the induction cooker 100 according to Embodiment 2 and a heating operation of the induction cooker 100 according to Embodiment 1.

(Modifications)

The foregoing description has dealt with the operation in which the control unit 45 equalizes the products of electric power that is supplied to adjacent three or more of the first to fourth heating coils 1a to 1d and the duration of conduction. The outer peripheral part of the heating target 5 is larger in heat transfer amount than the central part of the heating target 5. For this reason, the outer peripheral part of the heating target 5 may be more likely to become lower in temperature than the central part of the heating target 5. For this reason, the following operation may be performed instead of the foregoing operation.

When the heating target 5 is placed over adjacent three or more of the first to fourth heating coils 1a to 1d, the control unit 45 performs the following operation. The control unit 45 makes the product of electric power that is supplied to outside two of the three or more adjacent heating coils and the duration of conduction larger than the product of electric power that is supplied to inside one or more of the three or more adjacent heating coils and the duration of conduction.

For example, when the medium-diameter heating target 5b is placed over the first heating coil 1a, the second heating coil 1b, and the third heating coil 1c, the control unit 45 performs the following operation. The control unit 45 makes an amount of electric power represented by the product of a total of electric power that is supplied to the first heating coil 1a and the third heating coil 1c and the duration of conduction larger than an amount of electric power represented by the product of electric power that is supplied to the second heating coil 1b and the duration of conduction.

Further, for example, when the large-diameter heating target 5c is placed over the first heating coil 1a, the second heating coil 1b, the third heating coil 1c, and the fourth heating coil 1d, the control unit 45 performs the following operation. The control unit 45 makes an amount of electric power represented by the product of a total of electric power that is supplied to the first heating coil 1a and the fourth heating coil 1d and the duration of conduction larger than an amount of electric power represented by the product of a total of electric power that is supplied to the second heating coil 1b and the third heating coil 1c and the duration of conduction.

This operation can make the outer peripheral part of the heating target 5 larger in heat transfer amount than the central part of the heating target 5 and makes it possible to reduce nonuniformity in heating temperature of the heating target 5. This makes it possible to reduce nonuniformity in temperature of the cooking target and scorching of the cooking target.

Embodiment 3

The following describes operation of an induction cooker 100 according to Embodiment 3 with a focus on differences from Embodiments 1 and 2. The induction cooker 100 according to Embodiment 3 is the same in configuration as that of Embodiment 1. Components that are the same as those of Embodiment 1 are given the same reference signs, and a description of such components is omitted.

(Operation)

As in the case of Embodiment 1, when a user places a heating target 5 on the top plate 4 and gives the operation unit 40 an instruction to start heating, the load determination unit 46 of the control unit 45 performs a load determination process. The control unit 45 controls the driver circuits 50a to 50d according to a result of the load determination process and performs a heating operation appropriate to induction heating power and the cooking menu.

The following describes, in relation to an operation that is performed in a case where the convector mode has been selected as a cooking menu by an input from the operation unit 40, a case where the size of a heating target placed on the top plate 4 is a medium diameter and a case where the size of a heating target placed on the top plate 4 is a large diameter.

(Medium Diameter)

Figure 32:
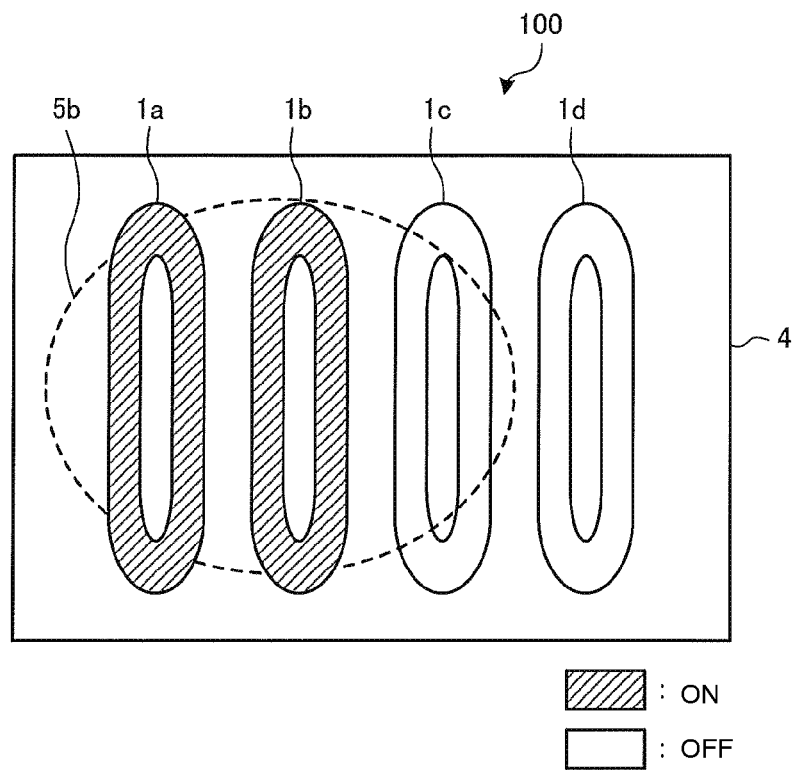
FIG. 32 is a plan view schematically showing a conducting state of a plurality of heating coils of an induction cooker according to Embodiment 3.
Figure 33:
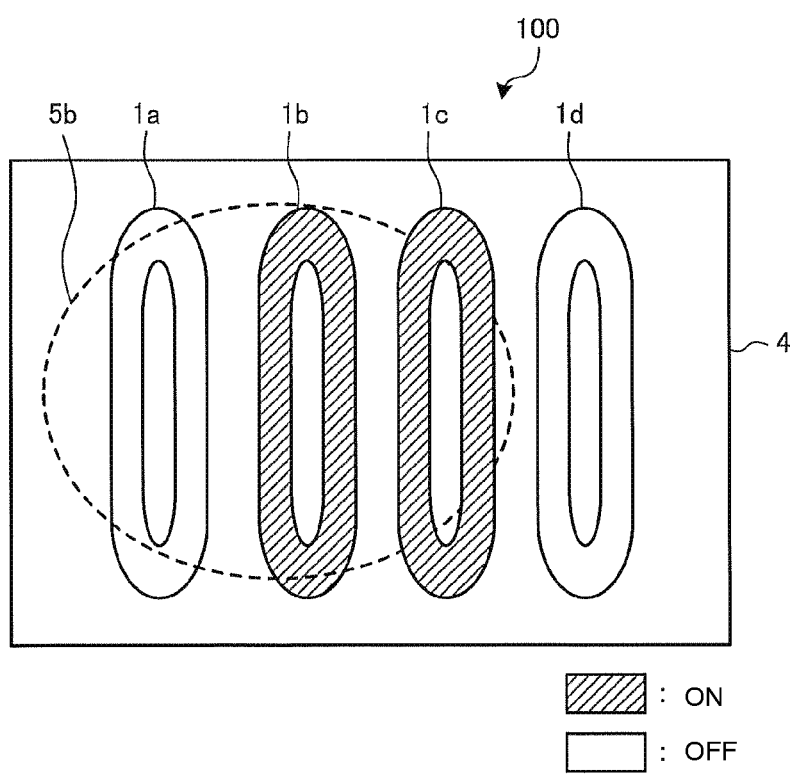
FIG. 33 is a plan view schematically showing a conducting state of the plurality of heating coils of the induction cooker according to Embodiment 3.

FIGS. 32 and 33 are each a plan view schematically showing a conducting state of the plurality of heating coils of the induction cooker according to Embodiment 3.

Figure 34:
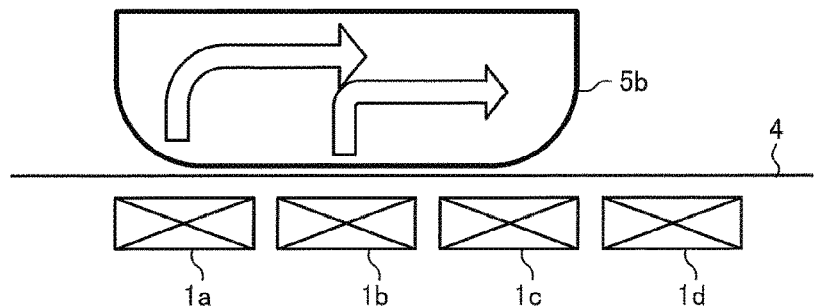
FIG. 34 is a diagram showing the plurality of heating coils of the induction cooker according to Embodiment 3 and a heating target.
Figure 35:
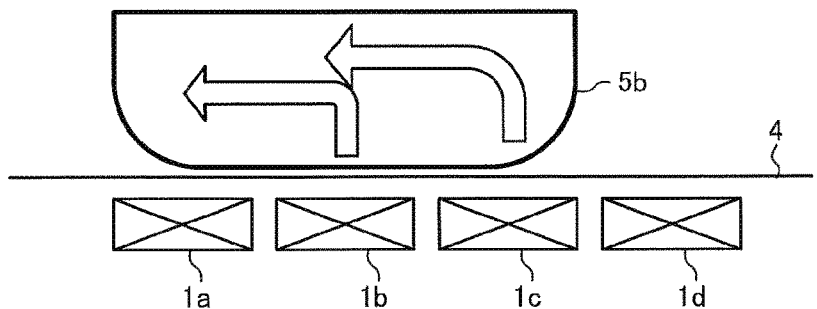
FIG. 35 is a diagram showing the plurality of heating coils of the induction cooker according to Embodiment 3 and the heating target.

FIGS. 34 and 35 are each a diagram showing the plurality of heating coils of the induction cooker according to Embodiment 3 and a heating target.

In each of FIGS. 32 and 33, the solid lines indicate the first to fourth heating coils 1a to 1d disposed below the top plate 4, and the dotted line indicates the heating target 5b placed on the top plate 4.

Further, FIGS. 34 and 35 each schematically show a longitudinal section with the heating target 5b placed on the top plate 4. Further, in FIGS. 34 and 35, the arrows indicate directions of convection having occurred in a liquid cooking target contained in the heating target 5b.

When, as shown in FIGS. 32 and 33, the heating target 5b is placed over the first heating coil 1a, the second heating coil 1b, and the third heating coil 1c, the control unit 45 performs the following operation. The control unit 45 alternately switches between the supply of electric power to a set of the first heating coil 1a and the second heating coil 1b and the supply of electric power to a set of the second heating coil 1b and the third heating coil 1c.

That is, when the heating target 5b is placed over adjacent three of the first to fourth heating coils 1a to 1d, the control unit 45 supplies electric power to a set of adjacent two of the three adjacent ones of the first to fourth heating coils 1a to 1d and changes the set of the two of the three adjacent ones of the first to fourth heating coils 1a to 1d overtime.

Further, the control unit 45 equalizes an amount of electric power represented by the product of a total of electric power that is supplied to the first heating coil 1a and the second heating coil 1b and the duration of conduction and an amount of electric power represented by the product of a total of electric power that is supplied to the second heating coil 1b and the third heating coil 1c and the duration of conduction.

When, as shown in FIG. 32, electric power is supplied to the set of the first heating coil 1a and the second heating coil 1b and the supply of electric power to the third heating coil 1c is stopped, convection such as that shown in FIG. 34 occurs. That is, the liquid cooking target contained in the heating target 5b convects in such a manner that portions of the liquid cooking target located above the first heating coil 1a and the second heating coil 1b are heated, move upward from the lower part of the heating target 5b, and then move toward the right as see from the front of the drawing sheet of FIG. 34, that is, toward an area above the third heating coil 1c.

When, as shown in FIG. 33, electric power is supplied to the set of the second heating coil 1b and the third heating coil 1c and the supply of electric power to the first heating coil 1a is stopped, convection such as that shown in FIG. 35 occurs. That is, the liquid cooking target contained in the heating target 5b convects in such a manner that portions of the liquid cooking target located above the second heating coil 1b and the third heating coil 1c are heated, move upward from the lower part of the heating target 5b, and then move toward the left as see from the front of the drawing sheet of FIG. 35, that is, toward an area above the first heating coil 1a.

In this way, supplying electric power to a set of adjacent two of the three adjacent heating coils and changing the set of the two adjacent heating coils over time effects convection in the liquid cooking target, such as broth, contained in the heating target 5b, allowing the liquid cooking target to disperse.

(Large Diameter)

Figure 36:
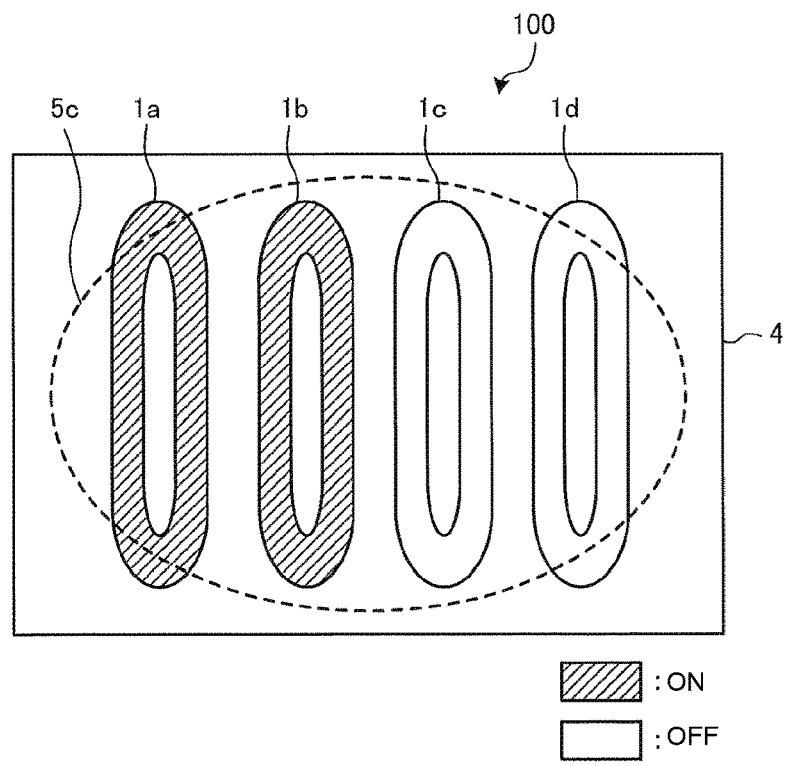
FIG. 36 is a plan view schematically showing a conducting state of the plurality of heating coils of the induction cooker according to Embodiment 3.
Figure 37:
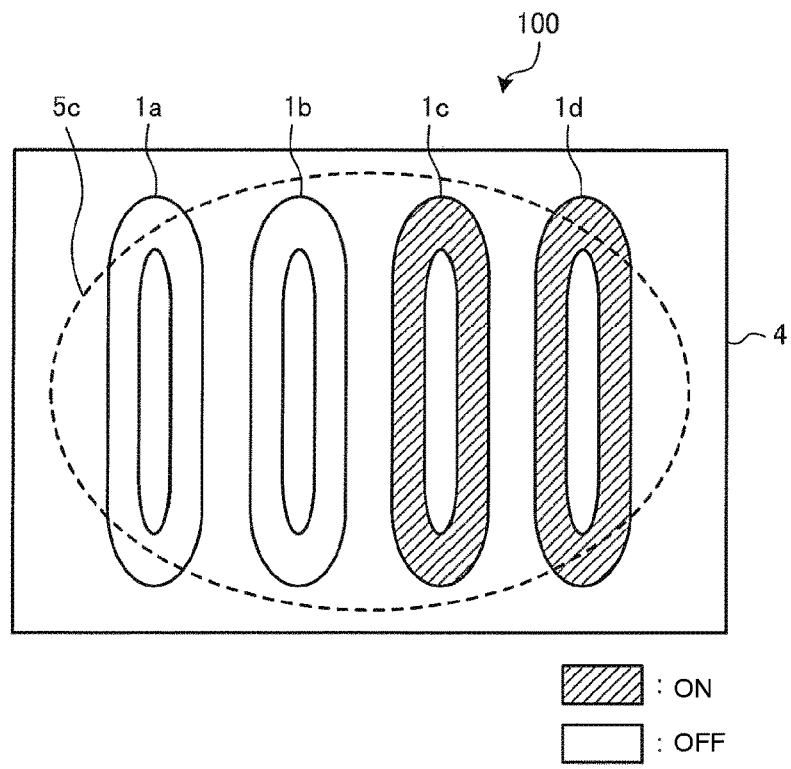
FIG. 37 is a plan view schematically showing a conducting state of the plurality of heating coils of the induction cooker according to Embodiment 3.

FIGS. 36 and 37 are each a plan view schematically showing a conducting state of the plurality of heating coils of the induction cooker according to Embodiment 3.

Figure 38:
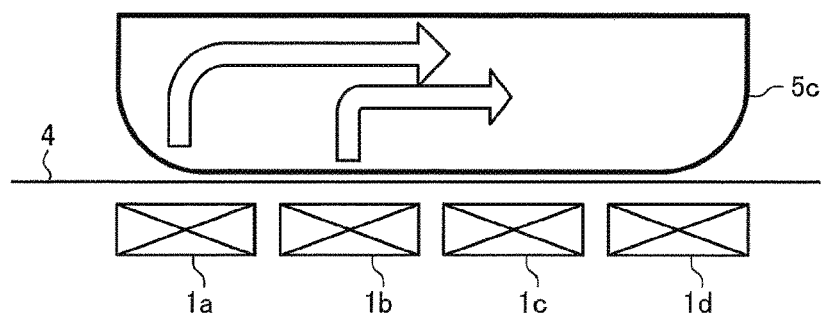
FIG. 38 is a diagram showing the plurality of heating coils of the induction cooker according to Embodiment 3 and a heating target.
Figure 39:
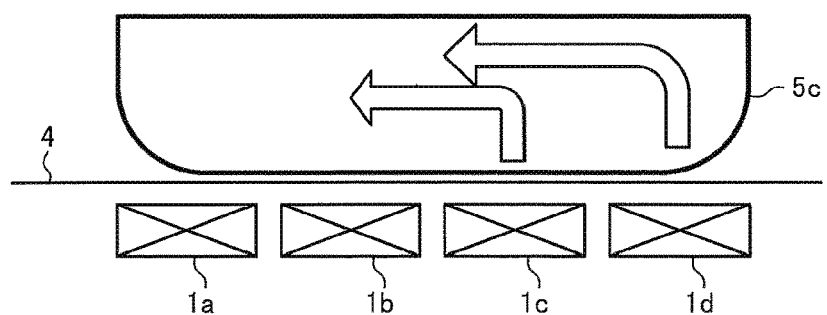
FIG. 39 is a diagram showing the plurality of heating coils of the induction cooker according to Embodiment 3 and the heating target.

FIGS. 38 and 39 are each a diagram showing the plurality of heating coils of the induction cooker according to Embodiment 3 and a heating target.

In each of FIGS. 36 and 37, the solid lines indicate the first to fourth heating coils 1a to 1d disposed below the top plate 4, and the dotted line indicates the heating target 5c placed on the top plate 4.

Further, FIGS. 38 and 39 each schematically show a longitudinal section with the heating target 5c placed on the top plate 4. Further, in FIGS. 38 and 39, the arrows indicate directions of convection having occurred in a liquid cooking target contained in the heating target 5c.

When, as shown in FIGS. 36 and 37, the heating target 5c is placed over the first heating coil 1a, the second heating coil 1b, the third heating coil 1c, and the fourth heating coil 1d, the control unit 45 performs the following operation. The control unit 45 alternately switches between the supply of electric power to a set of the first heating coil 1a and the second heating coil 1b and the supply of electric power to a set of the third heating coil 1c and the fourth heating coil 1d.

That is, when the heating target 5c is placed over four adjacent heating coils, the control unit 45 supplies electric power to a set of adjacent two of the four adjacent heating coils and changes the set of the two of the four adjacent heating coils over time.

Further, the control unit 45 equalizes an amount of electric power represented by the product of a total of electric power that is supplied to the first heating coil 1a and the second heating coil 1b and the duration of conduction and an amount of electric power represented by the product of a total of electric power that is supplied to the third heating coil 1c and the fourth heating coil 1d and the duration of conduction.

When, as shown in FIG. 36, electric power is supplied to the set of the first heating coil 1a and the second heating coil 1b and the supply of electric power to the third heating coil 1c and the fourth heating coil 1d is stopped, convection such as that shown in FIG. 38 occurs. That is, the liquid cooking target contained in the heating target 5c convects in such a manner that portions of the liquid cooking target located above the first heating coil 1a and the second heating coil 1b are heated, move upward from the lower part of the heating target 5c, and then move toward the right as see from the front of the drawing sheet of FIG. 38, that is, toward an area above the third heating coil 1c.

When, as shown in FIG. 37, electric power is supplied to the set of the third heating coil 1c and the fourth heating coil 1d and the supply of electric power to the first heating coil 1a and the second heating coil 1b is stopped, convection such as that shown in FIG. 39 occurs. That is, the liquid cooking target contained in the heating target 5c convects in such a manner that portions of the liquid cooking target located above the third heating coil 1c and the fourth heating coil 1d are heated, move upward from the lower part of the heating target 5c, and then move toward the left as see from the front of the drawing sheet of FIG. 39, that is, toward an area above the second heating coil 1b.

In this way, supplying electric power to a set of adjacent two of the four adjacent heating coils and changing the set of the two adjacent heating coils over time effects convection in the liquid cooking target, such as broth, contained in the heating target 5c, allowing the liquid cooking target to disperse.

Although, in either of the aforementioned medium-diameter and large-diameter heating operations, electric power is supplied to at least one of the three or more heating coils over which the heating target 5 is placed and the supply of electric power to one or more other ones of the three or more heating coils is stopped, this is not intended to impose any limitation on the present invention. For example, the control unit 45 may supply more electric power to at least one of the three or more adjacent heating coils than to one or more other ones of the three or more adjacent heating coils.

(Effects)

As noted above, in Embodiment 3, the control unit 45 is configured to, when the heating target 5 is placed over adjacent three or more of the first to fourth heating coils 1a to 1d, supply electric power to a set of adjacent two of the three or more adjacent ones of the first to fourth heating coils 1a to 1d and change the set of the two of the three or more adjacent ones of the first to fourth heating coils 1a to 1d over time.

This makes it possible to produce convection from one end of an arrangement of a plurality of heating coils toward the other end and alternately switch the direction of the convection, bringing about an effect of eliminating unevenness in flavor and improving flavor penetration by dispersing the broth in cooking a boiled dish or other dishes. Further, heated portions of the heating target 5 are changed over time, so that the liquid cooking target contained in the heating target 5 can be warmed or kept warm with reduced scorching.

Further, the supply of electric power to two adjacent heating coils allows the liquid cooking target contained in the heating target 5 to convect in a larger way than the supply of electric power to one heating coil or two non-adjacent heating coils.

Further, in Embodiment 3, the control unit 45 equalizes the products of electric power that is supplied to adjacent two of the first to fourth heating coils 1a to 1d and the duration of conduction. This makes it possible to reduce nonuniformity in heating temperature of the heating target 5 and reduce nonuniformity in temperature of the cooking target.

Although the foregoing description has dealt with an operation in the convector mode, which causes convection in a liquid cooking target contained in a heating target 5, the aforementioned heating operation may also be applied to a cooking mode of heating a heating target 5, such as a frying pan or an iron plate, on which a solid cooking target is placed.

Since heated portions of the heating target 5, such as a frying pan or an iron plate, are changed over time, the solid cooking target placed on the heating target 5 can be heated or kept warm with reduced scorching.

A heating operation of the induction cooker 100 according to Embodiment 3 and heating operations of the induction cookers 100 according to Embodiments 1 and 2 may be combined with one another. For example, the control unit 45 may sequentially perform heating operations of the induction cookers 100 according to Embodiments 1 to 3.

(Modification 1)

Although the foregoing description has dealt with the operation of alternately switching between two sets when the large-diameter heating target 5c is placed over the first to fourth heating coils 1a to 1d, this is not intended to impose any limitation on the present invention. The supply of electric power to a set of adjacent two of four adjacent heating coils may be sequentially changed. A specific example is described below.

(Large Diameter)

Figure 40:
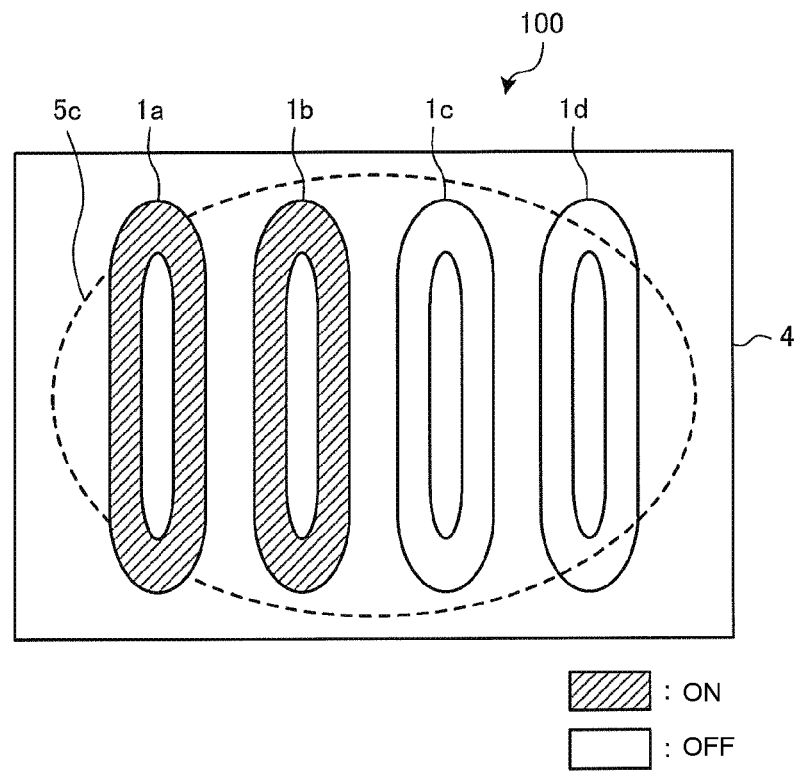
FIG. 40 is a plan view schematically showing a conducting state of the plurality of heating coils of the induction cooker according to Embodiment 3.
Figure 41:
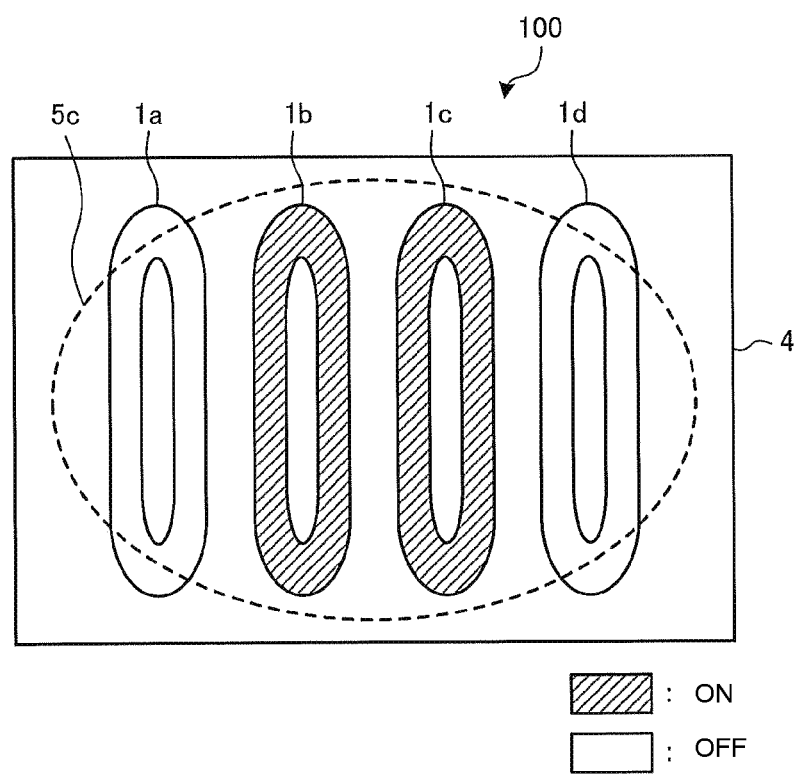
FIG. 41 is a plan view schematically showing a conducting state of the plurality of heating coils of the induction cooker according to Embodiment 3.
Figure 42:
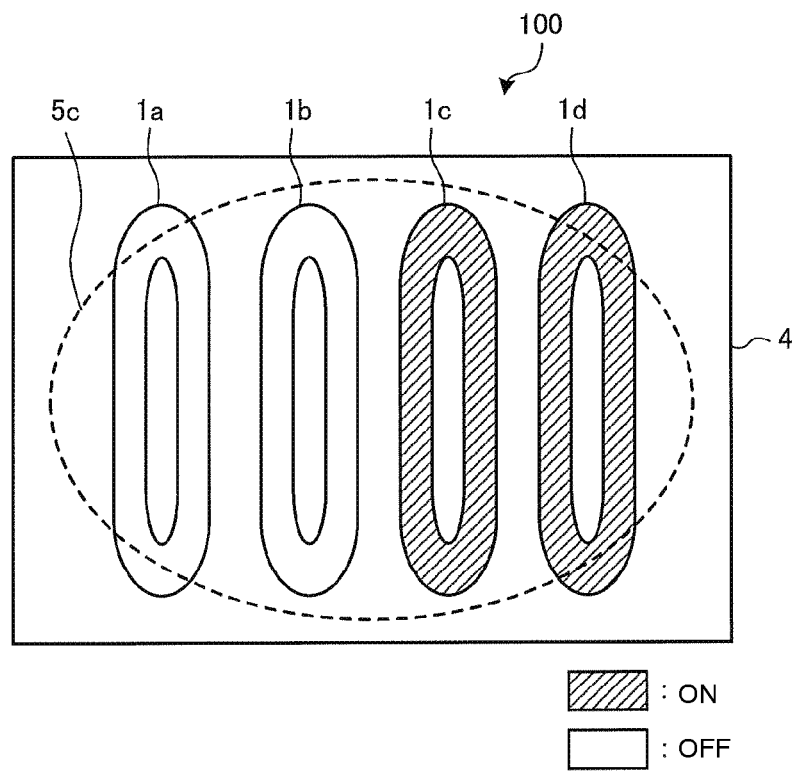
FIG. 42 is a plan view schematically showing a conducting state of the plurality of heating coils of the induction cooker according to Embodiment 3.

FIGS. 40 to 42 are each a plan view schematically showing a conducting state of the plurality of heating coils of the induction cooker according to Embodiment 3.

Figure 43:
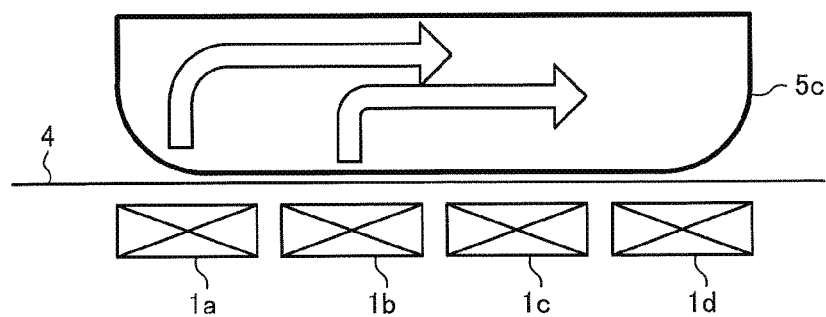
FIG. 43 is a diagram showing the plurality of heating coils of the induction cooker according to Embodiment 3 and the heating target.
Figure 44:
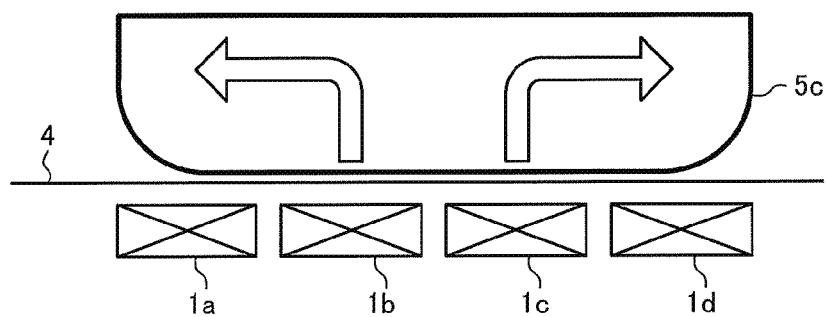
FIG. 44 is a diagram showing the plurality of heating coils of the induction cooker according to Embodiment 3 and the heating target.
Figure 45:
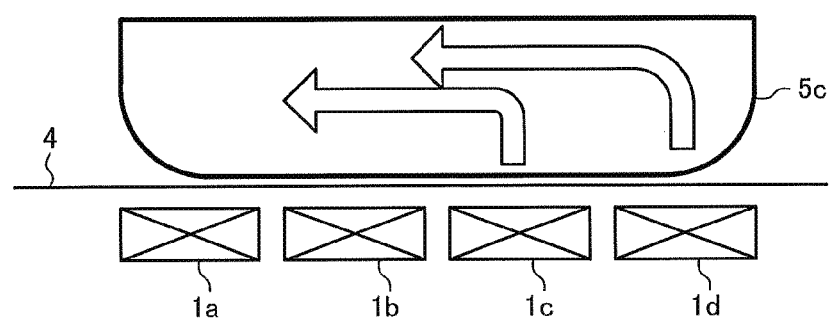
FIG. 45 is a diagram showing the plurality of heating coils of the induction cooker according to Embodiment 3 and the heating target.

FIGS. 43 to 45 are each a diagram showing the plurality of heating coils of the induction cooker according to Embodiment 3 and a heating target.

In each of FIGS. 40 to 42, the solid lines indicate the first to fourth heating coils 1a to 1d disposed below the top plate 4, and the dotted line indicates the heating target 5c placed on the top plate 4.

Further, FIGS. 43 to 45 each schematically show a longitudinal section with the heating target 5c placed on the top plate 4. Further, in FIGS. 43 to 45, the arrows indicate directions of convection having occurred in a liquid cooking target contained in the heating target 5c.

When, as shown in FIGS. 40 to 42, the heating target 5c is placed over the first heating coil 1a, the second heating coil 1b, the third heating coil 1c, and the fourth heating coil 1d, the control unit 45 performs the following operation. The control unit 45 sequentially switches among the supply of electric power to a set of the first heating coil 1a and the second heating coil 1b, the supply of electric power to a set of the second heating coil 1b and the third heating coil 1c, and the supply of electric power to a set of the third heating coil 1c and the fourth heating coil 1d.

That is, when the heating target 5c is placed over adjacent four heating coils, the control unit 45 supplies electric power to a set of adjacent two of the four adjacent heating coils and changes the set of the two of the four adjacent heating coils over time.

Further, the control unit 45 equalizes an amount of electric power represented by the product of a total of electric power that is supplied to the first heating coil 1a and the second heating coil 1b and the duration of conduction, an amount of electric power represented by the product of a total of electric power that is supplied to the second heating coil 1b and the third heating coil 1c and the duration of conduction, and an amount of electric power represented by the product of a total of electric power that is supplied to the third heating coil 1c and the fourth heating coil 1d and the duration of conduction.

When, as shown in FIG. 40, electric power is supplied to the set of the first heating coil 1a and the second heating coil 1b and the supply of electric power to the set of the third heating coil 1c and the fourth heating coil 1d is stopped, convection such as that shown in FIG. 43 occurs. That is, the liquid cooking target contained in the heating target 5c convects in such a manner that portions of the liquid cooking target located above the first heating coil 1a and the second heating coil 1b are heated, move upward from the lower part of the heating target 5c, and then move toward the right as see from the front of the drawing sheet of FIG. 43, that is, toward an area above the third heating coil 1c.

When, as shown in FIG. 41, electric power is supplied to the set of the second heating coil 1b and the third heating coil 1c and the supply of electric power to the first heating coil 1a and the fourth heating coil 1d is stopped, convection such as that shown in FIG. 44 occurs. That is, the liquid cooking target contained in the heating target 5c convects in such a manner that a portion of the liquid cooking target located above the second heating coil 1b is heated, moves upward from the lower part of the heating target 5c, and then moves toward the left as see from the front of the drawing sheet of FIG. 44, that is, toward an area above the first heating coil 1a. At the same time, the liquid cooking target contained in the heating target 5c convects in such a manner that a portion of the liquid cooking target located above the third heating coil 1c is heated, moves upward from the lower part of the heating target 5c, and then moves toward the right as see from the front of the drawing sheet of FIG. 44, that is, toward an area above the fourth heating coil 1d.

When, as shown in FIG. 42, electric power is supplied to the set of the third heating coil 1c and the fourth heating coil 1d and the supply of electric power to the first heating coil 1a and the second heating coil 1b is stopped, convection such as that shown in FIG. 45 occurs. That is, the liquid cooking target contained in the heating target 5c convects in such a manner that portions of the liquid cooking target located above the third heating coil 1c and the fourth heating coil 1d are heated, move upward from the lower part of the heating target 5c, and then move toward the left as see from the front of the drawing sheet of FIG. 45, that is, toward an area above the second heating coil 1b.

In this way, supplying electric power to a set of adjacent two of the four adjacent heating coils and changing the set of the two adjacent heating coils over time effects convection in the liquid cooking target, such as broth, contained in the heating target 5c, allowing the liquid cooking target to disperse.

Further, this operation more disperses heating positions of the heating target 5 over time than the operation of alternately switching between two sets, so that the liquid cooking target contained in the heating target 5 can be warmed or kept warm with reduced scorching.

(Modification 2)

Although the foregoing description has dealt with the operation of supplying electric power to a set of adjacent two of the first to fourth heating coils 1a to 1d, this is not intended to impose any limitation on the present invention. Electric power may be supplied to a set of adjacent three of the first to fourth heating coils 1a to 1d, and the supply of electric power to the set of three heating coils may be sequentially changed over time. A specific example is described below.

(Large Diameter)

Figure 46:
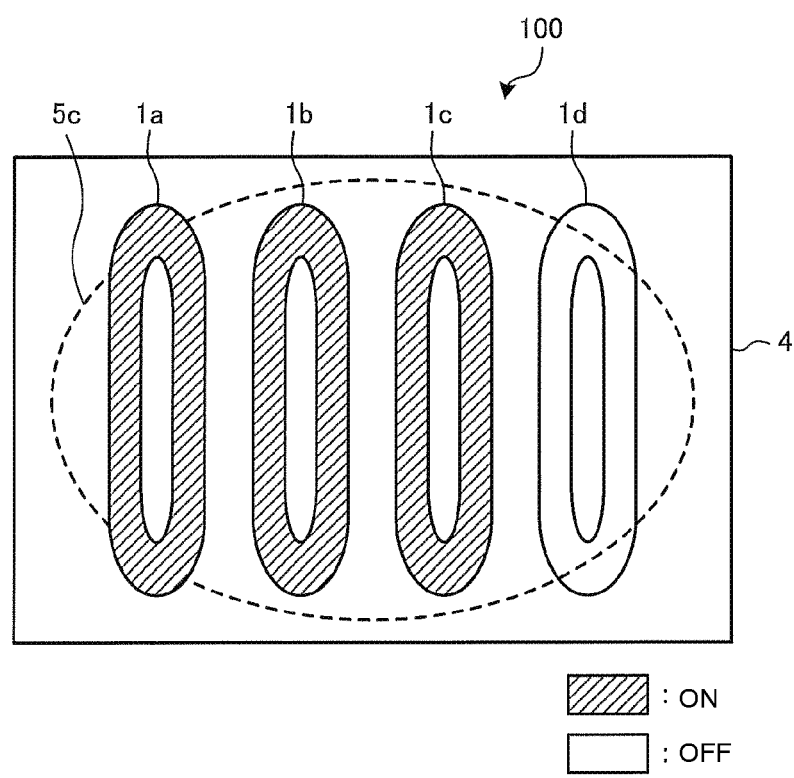
FIG. 46 is a plan view schematically showing a conducting state of the plurality of heating coils of the induction cooker according to Embodiment 3.
Figure 47:
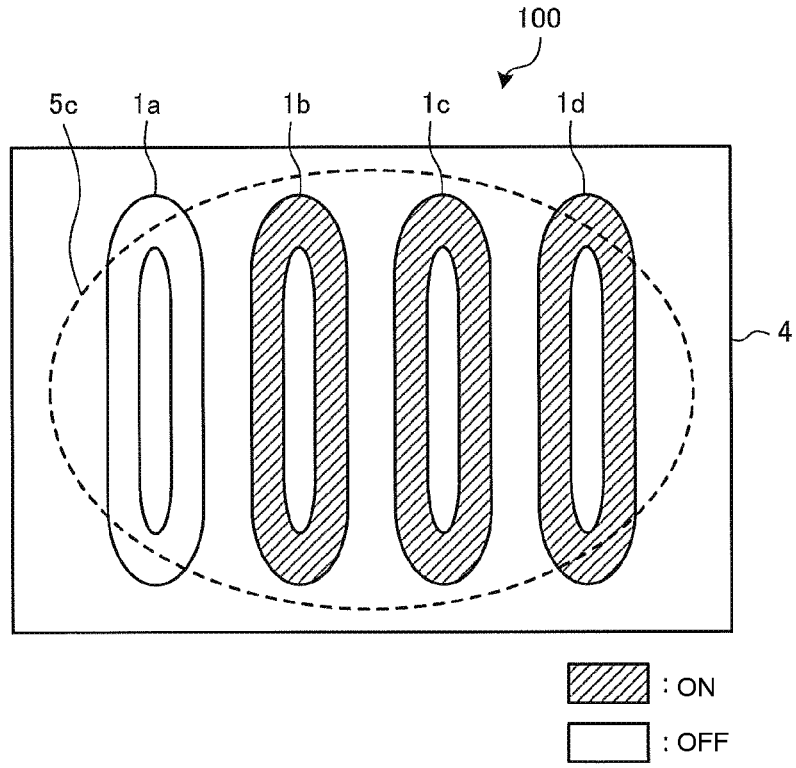
FIG. 47 is a plan view schematically showing a conducting state of the plurality of heating coils of the induction cooker according to Embodiment 3.

FIGS. 46 and 47 are each a plan view schematically showing a conducting state of the plurality of heating coils of the induction cooker according to Embodiment 3.

Figure 48:
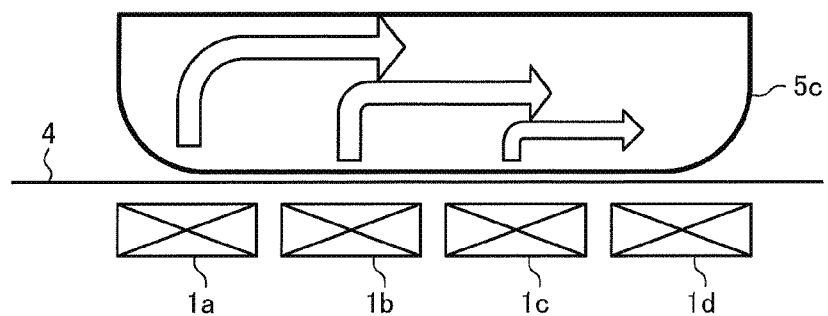
FIG. 48 is a diagram showing the plurality of heating coils of the induction cooker according to Embodiment 3 and the heating target.
Figure 49:
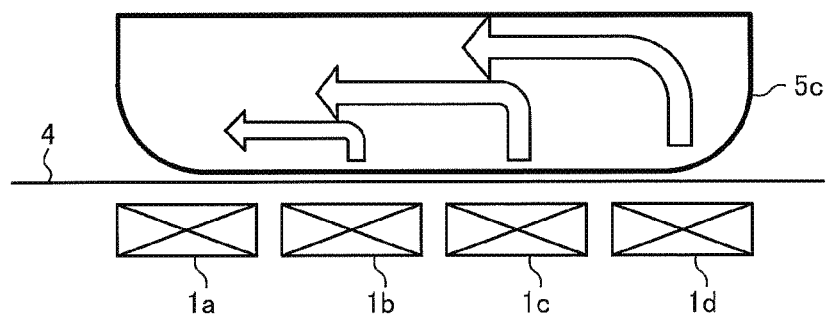
FIG. 49 is a diagram showing the plurality of heating coils of the induction cooker according to Embodiment 3 and the heating target.

FIGS. 48 and 49 are each a diagram showing the plurality of heating coils of the induction cooker according to Embodiment 3 and a heating target.

In each of FIGS. 46 and 47, the solid lines indicate the first to fourth heating coils 1a to 1d disposed below the top plate 4, and the dotted line indicates the heating target 5c placed on the top plate 4.

Further, FIGS. 48 and 49 each schematically show a longitudinal section with the heating target 5c placed on the top plate 4. Further, in FIGS. 48 and 49, the arrows indicate directions of convection having occurred in a liquid cooking target contained in the heating target 5c.

When, as shown in FIGS. 46 and 47, the heating target 5c is placed over the first heating coil 1a, the second heating coil 1b, the third heating coil 1c, and the fourth heating coil 1d, the control unit 45 performs the following operation. The control unit 45 sequentially switches between the supply of electric power to a set of the first heating coil 1a, the second heating coil 1b, and the third heating coil 1c and the supply of electric power to a set of the second heating coil 1b, the third heating coil 1c, and the fourth heating coil 1d.

That is, when the heating target 5c is placed over adjacent four heating coils, the control unit 45 supplies electric power to a set of adjacent three of the four adjacent heating coils and changes the set of the three of the four adjacent heating coils over time.

Further, the control unit 45 equalizes an amount of electric power represented by the product of a total of electric power that is supplied to the first heating coil 1a, the second heating coil 1b, and the third heating coil 1c and the duration of conduction and an amount of electric power represented by the product of a total of electric power that is supplied to the second heating coil 1b, the third heating coil 1c, and the fourth heating coil 1d and the duration of conduction.

When, as shown in FIG. 46, electric power is supplied to the set of the first heating coil 1a, the second heating coil 1b, and the third heating coil 1c and the supply of electric power to the fourth heating coil 1d is stopped, convection such as that shown in FIG. 48 occurs. That is, the liquid cooking target contained in the heating target 5c convects in such a manner that portions of the liquid cooking target located above the first heating coil 1a, the second heating coil 1b, and the third heating coil 1c are heated, move upward from the lower part of the heating target 5c, and then move toward the right as see from the front of the drawing sheet of FIG. 48, that is, toward an area above the fourth heating coil 1d.

When, as shown in FIG. 47, electric power is supplied to the set of the second heating coil 1b, the third heating coil 1c, and the fourth heating coil 1d and the supply of electric power to the first heating coil 1a is stopped, convection such as that shown in FIG. 49 occurs. That is, the liquid cooking target contained in the heating target 5c convects in such a manner that portions of the liquid cooking target located above the second heating coil 1b, the third heating coil 1c, and the fourth heating coil 1d are heated, move upward from the lower part of the heating target 5c, and then move toward the left as see from the front of the drawing sheet of FIG. 49, that is, toward an area above the first heating coil 1a.

In this way, supplying electric power to a set of adjacent three of the four adjacent heating coils and changing the set of the three adjacent heating coils over time effects convection in the liquid cooking target, such as broth, contained in the heating target 5c, allowing the liquid cooking target to disperse. Further, since this operation allows the liquid cooking target contained in the heating target 5 to convect in a larger way than the operation of supplying electric power to a set of two heating coils.

(Modification 3)

The foregoing description has dealt with the operation in which the control unit 45 equalizes the products of electric power that is supplied to adjacent three or more of the first to fourth heating coils 1a to 1d and the duration of conduction. An outer peripheral part of the heating target 5 is larger in heat transfer amount than a central part of the heating target 5. For this reason, the outer peripheral part of the heating target 5 may be more likely to become lower in temperature than the central part of the heating target 5. For this reason, the following operation may be performed instead of the foregoing operation.

When the heating target 5 is placed over adjacent three or more of the first to fourth heating coils 1a to 1d, the control unit 45 performs the following operation. The control unit 45 makes the product of electric power that is supplied to outside two of the three or more adjacent heating coils and the duration of conduction larger than the product of electric power that is supplied to inside one or more of the three or more adjacent heating coils and the duration of conduction.

For example, when the medium-diameter heating target 5b is placed over the first heating coil 1a, the second heating coil 1b and the third heating coil 1c, the control unit 45 performs the following operation. The control unit 45 makes an amount of electric power represented by the product of a total of electric power that is supplied to the first heating coil 1a and the third heating coil 1c and the duration of conduction larger than an amount of electric power represented by the product of electric power that is supplied to the second heating coil 1b and the duration of conduction.

Further, for example, when the large-diameter heating target 5c is placed over the first heating coil 1a, the second heating coil 1b, the third heating coil 1c, and the fourth heating coil 1d, the control unit 45 performs the following operation. The control unit 45 makes an amount of electric power represented by the product of a total of electric power that is supplied to the first heating coil 1a and the fourth heating coil 1d and the duration of conduction larger than an amount of electric power represented by the product of a total of electric power that is supplied to the second heating coil 1b and the third heating coil 1c and the duration of conduction.

This operation can make the outer peripheral part of the heating target 5 larger in heat transfer amount than the central part of the heating target 5 and makes it possible to reduce nonuniformity in heating temperature of the heating target 5. This makes it possible to reduce nonuniformity in temperature of the cooking target and scorching of the cooking target.

Embodiment 4

The following describes operation of an induction cooker 100 according to Embodiment 4 with a focus on differences from Embodiments 1 to 3. The induction cooker 100 according to Embodiment 4 is the same in configuration as that of Embodiment 1. Components that are the same as those of Embodiment 1 are given the same reference signs, and a description of such components is omitted.

(Operation)

Figure 50:
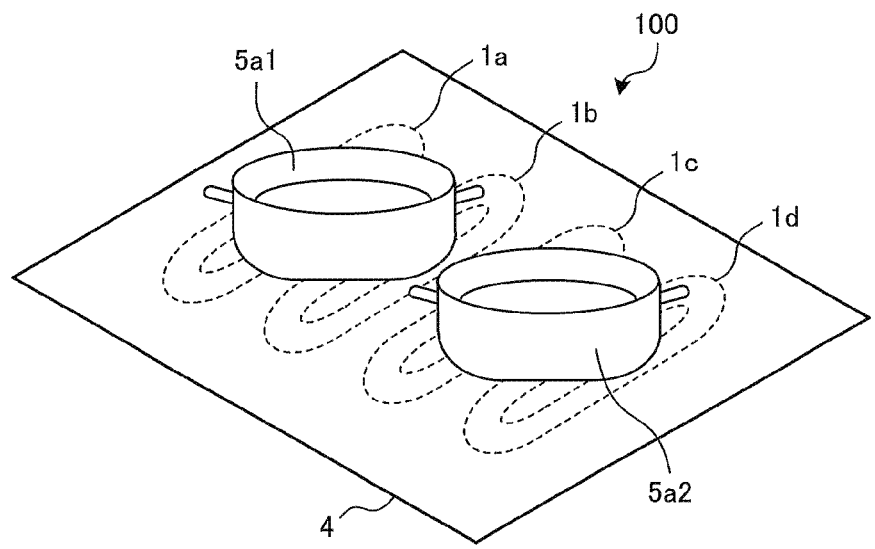
FIG. 50 is a perspective view showing an induction cooker according to Embodiment 4 and a heating target.

FIG. 50 is a perspective view showing an induction cooker according to Embodiment 4 and a heating target. It should be noted that FIG. 50 omits illustration of a lower configuration of the top plate 4.

When, as shown in FIG. 50, a small-diameter heating target 5a1 is placed over the first heating coil 1a and the second heating coil 1b by a user and a small-diameter heating target 5a2 is placed over the third heating coil 1c and the fourth heating coil 1d by the user, the control unit 45 performs the following operation. As in the case of Embodiment 1, when the operation unit 40 is given an instruction to start heating, the load determination unit 46 of the control unit 45 performs a load determination process. The control unit 45 controls the driver circuits 50a to 50d according to a result of the load determination process and performs a heating operation appropriate to induction heating power and the cooking menu.

When a cooking menu in which the two heating targets 5a1 and 5a2 are simultaneously subjected to cooking with heat in the convector mode is selected by an input from the operation unit 40, the control unit 45 simultaneously performs a heating operation of producing convection in a liquid cooking target contained in the heating target 5a1 and a heating operation of producing convection in a liquid cooking target contained in the heating target 5a2. Specifically, the control unit 45 alternately switches between the supply of electric power to the first heating coil 1a and the supply of electric power to the second heating coil 1b over time. At the same time, the control unit 45 alternately switches between the supply of electric power to the third heating coil 1c and the supply of electric power to the fourth heating coil 1d over time.

That is, when the heating target 5a is placed over a set of adjacent two of the first to fourth heating coils 1a to 1d and there are two adjacent sets of adjacent two of the first to fourth heating coils 1a to 1d, the supply of electric power to the two adjacent heating coils of each of the two sets is alternately switched.

In this way, the alternate conduction of electricity through the two adjacent heating coils of each of the two sets effects convection in each of the liquid cooking targets, such as broth, contained in the heating targets 5a1 and 5a2, allowing the liquid cooking targets to disperse. Further, this makes it possible to simultaneously heat two heating targets 5a1 and 5a1 in the convector mode and brings about improvement in user-friendliness.

Note here that conduction of a high-frequency current through each heating coil causes Joule's heat to be generated by the resistance of a winding wire constituting the heating coil. When electric power is simultaneously supplied to the second heating coil 1b and the third heating coil 1c, which are adjacent to each other, the generation of heat by each of the second heating coil 1b and the third heating coil 1c makes it easy for the second heating coil 1b and the third heating coil 1c to rise in temperature. Accordingly, the control unit 45 of the induction cooker 100 according to Embodiment 4 performs the following operation.

The control unit 45 makes the duration of simultaneous supply of electric power to the first heating coil 1a and the fourth heating coil 1d shorter than the duration of simultaneous supply of electric power to the second heating coil 1b and the third heating coil 1c. That is, the control unit 45 makes the duration of simultaneous supply of electric power to outside two of the plurality of heating coils shorter than the duration of simultaneous supply of electric power to inside two of the plurality of heating coils. Specific examples are described with reference to FIGS. 51 and 52.

Figure 51:
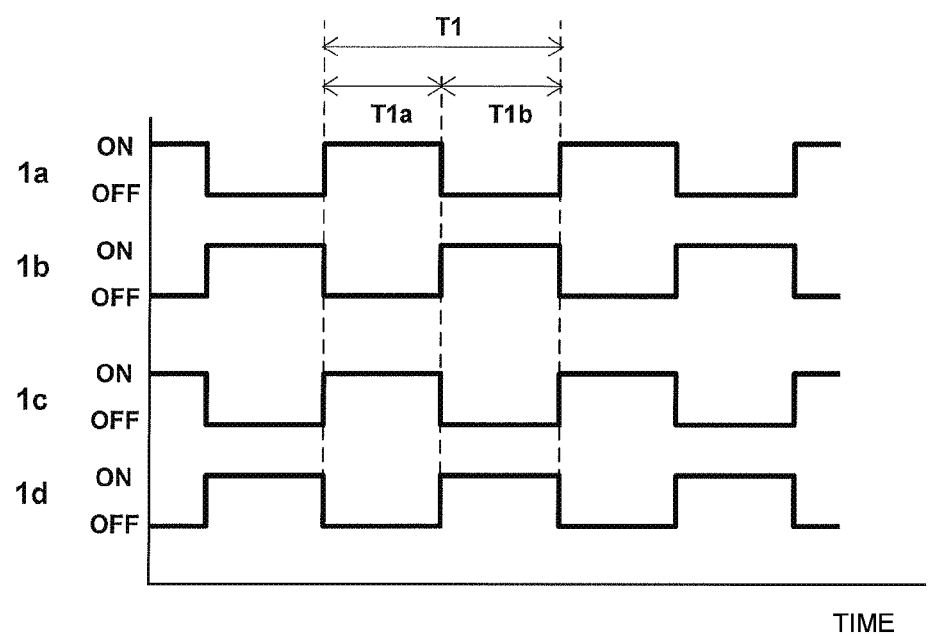
FIG. 51 is a diagram explaining a heating operation of the induction cooker according to Embodiment 4.

FIG. 51 is a diagram explaining a heating operation of the induction cooker according to Embodiment 4. In FIG. 51, the legend "ON" represents a state where electric power is supplied to a heating coil, and the legend "OFF" represents a state where the supply of electric power is stopped.

As shown in FIG. 51, the control unit 45 equalizes cycles of switching T1 of electric power that is supplied to each heating coil. Further, in a period of time T1a, the control unit 45 turns on the first heating coil 1a and the third heating coil 1c and turns off the second heating coil 1b and the fourth heating coil 1*d*. Further, in a period of time T1*b*, the control unit 45 turns off the first heating coil 1*a* and the third heating coil 1*c* and turns on the second heating coil 1*b* and the fourth heating coil 1*d*. The period of time T1*a* and the period of time T1*b* are equal in length of time.

This operation zeroes the duration of simultaneous supply of electric power to the first heating coil 1*a* and the fourth heating coil 1*d*, which are disposed toward the outside. Further, this operation zeroes the duration of simultaneous supply of electric power to the second heating coil 1*b* and the third heating coil 1*c*, which are disposed toward the center.

This makes it possible to suppress rises in temperature of the second heating coil 1*b* and the third heating coil 1*c*, which are disposed toward the center. This also makes it possible to transfer heat outside during stoppage of either the second heating coil 1*b* or the third heating coil 1*c*, bringing about an effect of making it easy to cool down the second heating coil 1*b* and the third heating coil 1*c*.

Figure 52:
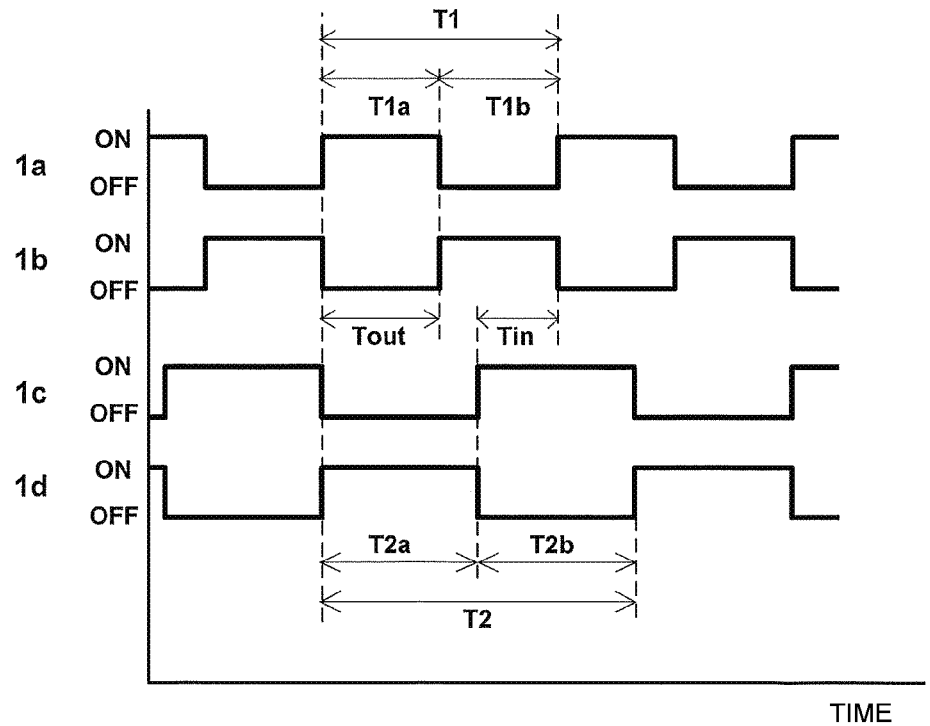
FIG. 52 is a diagram explaining a heating operation of the induction cooker according to Embodiment 4.

FIG. 52 is a diagram explaining a heating operation of the induction cooker according to Embodiment 4. In FIG. 52, the legend "ON" represents a state where electric power is supplied to a heating coil, and the legend "OFF" represents a state where the supply of electric power is stopped.

As shown in FIG. 52, the control unit 45 sets, to T1, cycles of switching of electric power that is supplied to the first heating coil 1*a* and the second heating coil 1*b*. In a period of time T1*a*, the control unit 45 turns on the first heating coil 1*a* and turns off the second heating coil 1*b*. Further, in a period of time T1*b*, the control unit 45 turns off the first heating coil 1*a* and turns on the second heating coil 1*b*. The period of time T1*a* and the period of time T1*b* are equal in length of time.

Further, the control unit 45 sets, to T2, cycles of switching of electric power that is supplied to the third heating coil 1*c* and the fourth heating coil 1*d*. T2 is longer than T1. In a period of time T2*a*, the control unit 45 turns off the third heating coil 1*c* and turns on the fourth heating coil 1*d*. Further, in a period of time T2*b*, the control unit 45 turns on the third heating coil 1*c* and turns off the fourth heating coil 1*d*. The period of time T2*a* and the period of time T2*b* are equal in length of time.

This operation makes the duration Tout of simultaneous supply of electric power to the first heating coil 1*a* and the fourth heating coil 1*d*, which are disposed toward the outside, longer than the duration Tin of simultaneous supply of electric power to the second heating coil 1*b* and the third heating coil 1*c*, which are disposed toward the center.

This makes it possible to suppress rises in temperature of the second heating coil 1*b* and the third heating coil 1*c*, which are disposed toward the center. This brings about an effect of making it easy to cool down the second heating coil 1*b* and the third heating coil 1*c*.

Although Embodiment 4 has described a case where the two heating targets 5*a*1 and 5*a*2 are placed over four heating coils, namely the first to fourth heating coils 1*a* to 1*d*, this is not intended to impose any limitation on the number of heating coils or the number of heating targets 5*a*.

For example, six heating coils may be aligned in one row, and three heating targets 5*a* may be placed and each heated in the convector mode by two heating coils.

Embodiment 5

The following describes operation of an induction cooker 100 according to Embodiment 5 with a focus on differences from Embodiments 1 to 4. The induction cooker 100 according to Embodiment 5 is the same in configuration as that of Embodiment 1. Components that are the same as those of Embodiment 1 are given the same reference signs, and a description of such components is omitted.

(Operation)

In addition to performing the same operation as any of Embodiments 1 to 4, the control unit 45 of the induction cooker 100 according to Embodiment 5 performs the following operation.

In supplying electric power to adjacent two of the first to fourth heating coils 1*a* to 1*d*, the control unit 45 causes electric currents to flow in directions same as each other through facing portions of the two adjacent heating coils.

For example, an example in which the operation of causing electric currents to flow in directions same as each other through facing portions of two adjacent heating coils is applied in addition to the operation of Embodiment 4 is described with reference to FIG. 53.

Figure 53:
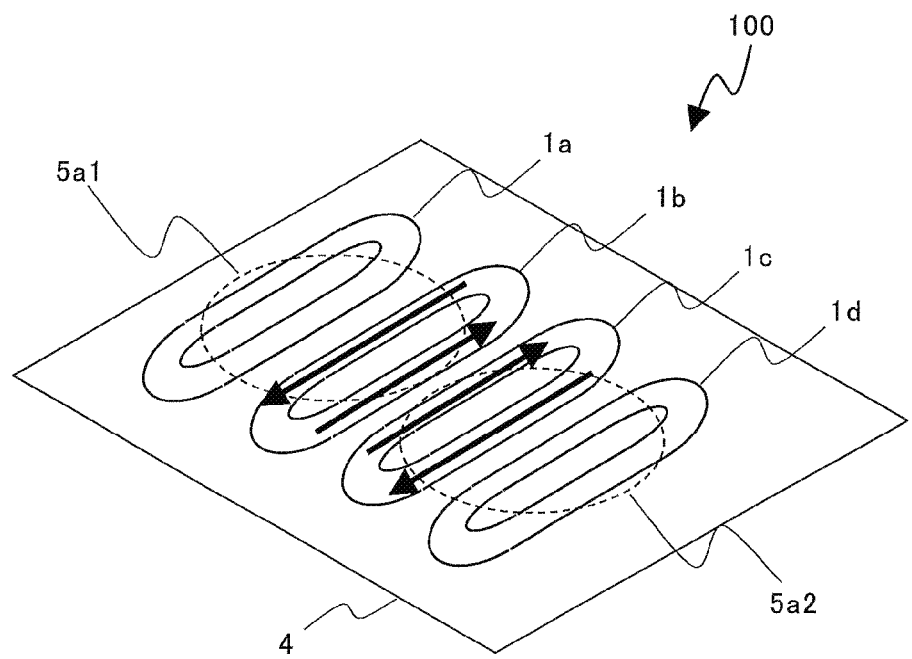
FIG. 53 is a perspective view schematically showing a plurality of heating coils of an induction cooker according to Embodiment 5.

FIG. 53 is a perspective view schematically showing a plurality of heating coils of an induction cooker according to Embodiment 5.

In FIG. 53, the solid lines indicate the first to fourth heating coils 1*a* to 1*d* disposed below the top plate 4, and the dotted lines indicate the heating targets 5*a*1 and 5*a*2 placed on the top plate 4. Further, in FIG. 53, the arrows indicate the instantaneous electric current directions of high-frequency currents passing through the second heating coil 1*b* and the third heating coil 1*c* in a state where electric power is simultaneously supplied to the second heating coil 1*b* and the third heating coil 1*c*.

As shown in FIG. 53, in supplying electric power to the second heating coil 1*b* and the third heating coil 1*c*, the control unit 45 drives the inverter circuits 23 of the driver circuits 50*b* and 50*c* so that electric currents flows in the same direction as each other through facing portions of the second heating coil 1*b* and the third heating coil 1*c*.

(Effects)

This operation causes the direction of a magnetic field generated from the second heating coil 1*b* and the direction of a magnetic field generated from the third heating coil 1*c* to be the same in the facing portions of the second heating coil 1*b* and the third heating coil 1*c*, so that the magnetic fields can be intensified. This makes it possible to increase the amounts of heat that are transferred to the heating targets 5 placed over the facing portions. This brings about an effect of intensifying convection over the facing portions.

Embodiment 6

The following describes a configuration and operation of an induction cooker 100 according to Embodiment 6 with a focus on differences from Embodiments 1 to 5. Components that are the same as those of Embodiment 1 are given the same reference signs, and a description of such components is omitted.

(Configuration)

Figure 54:
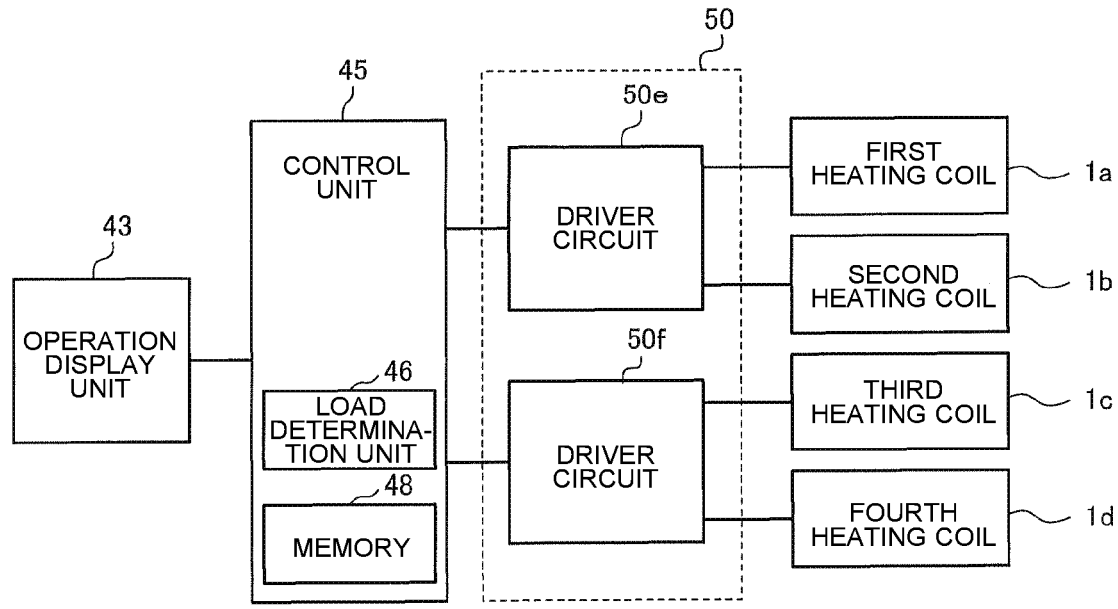
FIG. 54 is a block diagram showing a configuration of an induction cooker according to Embodiment 6.

FIG. 54 is a block diagram showing a configuration of an induction cooker according to Embodiment 6.

As shown in FIG. 54, driving of the first heating coil 1*a* and the second heating coil 1*b* is controlled by a driver circuit 50*e*. Driving of the third heating coil 1*c* and the fourth heating coil 1*d* is controlled by a driver circuit 50*f*. The supply of a high-frequency current to the first heating coil 1*a* from the driver circuit 50*e* causes a high-frequency magnetic field to be generated from the first heating coil 1*a*. The supply of a high-frequency current to the second heating coil 1*b* from the driver circuit 50*e* causes a high-frequency magnetic field to be generated from the second heating coil 1b. The supply of a high-frequency current to the third heating coil 1c from the driver circuit 50f causes a high-frequency magnetic field to be generated from the third heating coil 1c. The supply of a high-frequency current to the fourth heating coil 1d from the driver circuit 50f causes a high-frequency magnetic field to be generated from the fourth heating coil 1d.

Figure 55:
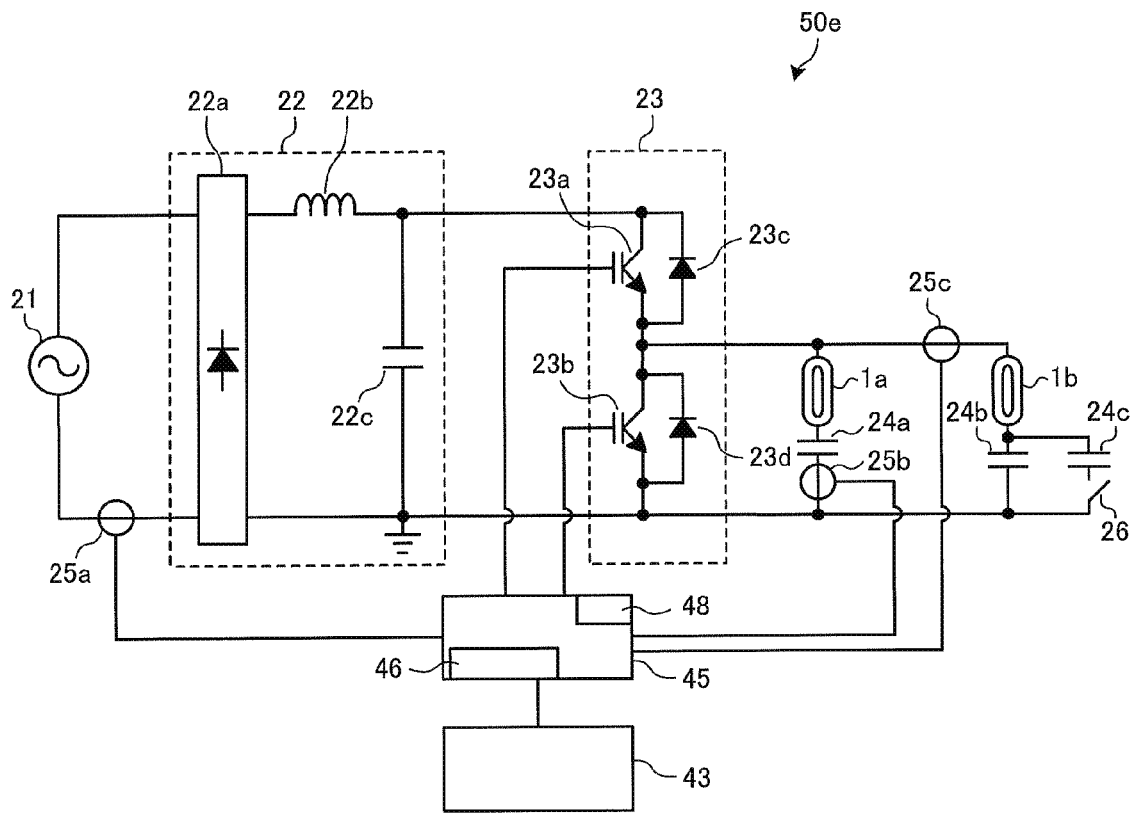
FIG. 55 is a diagram showing a driver circuit of the induction cooker according to Embodiment 6.

FIG. 55 is a diagram showing a driver circuit of the induction cooker according to Embodiment 6.

FIG. 55 illustrates the driver circuit 50e, which drives the first heating coil 1a and the second heating coil 1b.

As shown in FIG. 55, the driver circuit 50e includes a DC power supply circuit 22, an inverter circuit 23, a resonant capacitor 24a, a resonant capacitor 24b, a resonant capacitor 24c, and a switch 26. The DC power supply circuit 22 and the inverter circuit 23 are the same in configuration as those of Embodiment 1.

The resonant capacitor 24a is connected in series to the first heating coil 1a. The resonant capacitor 24b is connected in series to the second heating coil 1b. Further, the resonant capacitor 24c is connected in parallel to the resonant capacitor 24b via the switch 26.

The first heating coil 1a and the resonant capacitor 24a constitute a first resonant circuit. The second heating coil 1b, the resonant capacitor 24b, and the resonant capacitor 24c constitute a second resonant circuit. The first resonant circuit and the second resonant circuit are connected in parallel to each other.

The first resonant circuit has a resonant frequency that depends on the inductance of the first heating coil 1a and the capacitance of the resonant capacitor 24a.

The second resonant circuit has a resonant frequency that depends on the inductance of the second heating coil 1b and the capacitances of the resonant capacitor 24b and the resonant capacitor 24c.

The switch 26 is turned on and off by the control unit 45. In a case where the switch 26 is in an on state, the resonant capacitor 24c is connected in parallel to the resonant capacitor 24b. The switch 26 is constituted, for example, by a power semiconductor, a relay, or other devices.

In a case where the switch 26 is in an on state, the resonant frequency of the second resonant circuit is a first resonant frequency f1 that depends on the resultant capacitance of the resonant capacitor 24b and the resonant capacitor 24c and the inductance of the second heating coil 1b.

Further, in a case where the switch 26 is in an off state, the resonant frequency of the second resonant circuit is a second resonant frequency f2 that depends on the capacitance of the resonant capacitor 24b alone and the inductance of the second heating coil 1b. That is, the second resonant frequency f2, which is taken on in a case where the switch 26 is in an off state, is higher than the first resonant frequency f1, which is taken on in a case where the switch 26 is in an on state.

The first heating coil 1a and the second heating coil 1b are configured such that their inductances take on substantially the same value. The resonant capacitor 24a, the resonant capacitor 24b, and the resonant capacitor 24b are configured such that the capacitance of the resonant capacitor 24a and the resultant capacitance of the resonant capacitor 24b and the resonant capacitor 24b take on substantially the same value. That is, the resonant frequency of the first resonant circuit takes on substantially the same value as the first resonant frequency f1, which the second resonant circuit takes on in a case where the switch 26 is in an on state.

The coil current detection unit 25b detects an electric current flowing through the first heating coil 1a and outputs, to the control unit 45, a voltage signal representing a coil current value. Further, the coil current detection unit 25c detects an electric current flowing through the second heating coil 1b and outputs, to the control unit 45, a voltage signal representing a coil current value.

Although FIG. 55 has described the driver circuit 50e, which drives the first heating coil 1a and the second heating coil 1b, the same configuration may be applied to the driver circuit 50f, which drives the third heating coil 1c and the fourth heating coil 1d.

Although FIG. 55 has described a configuration in which two heating coils, namely the first heating coil 1a and the second heating coil 1b, are driven by one driver circuit, namely the driver circuit 50e, this is not intended to impose any limitation on the number of heating coils. The single driver circuit 50e may be configured to supply high-frequency power to two or more heating coils and may include a plurality of resonant capacitors forming a resonant circuit with each of the two or more heating coils, and at least one of the plurality of resonant capacitors may be configured to have a variable capacitance.

(Operation)

The control unit 45 of the induction cooker 100 according to Embodiment 6 performs an operation of, by changing the capacitances of the resonant capacitors of the second resonant circuit and the driving frequency of the inverter circuit 23, changing the magnitude of electric power that is supplied to two heating coils, namely the first heating coil 1a and the second heating coil 1b.

The following describes an operation that the control unit 45 performs when, as described in FIG. 50, a small-diameter heating target 5a1 is placed over the first heating coil 1a and the second heating coil 1b by a user.

When the operation unit 40 is given an instruction to start heating, the load determination unit 46 of the control unit 45 performs a load determination process. The load determination unit 46 detects an input current from an output signal of the input current detection unit 25a. At the same time, the control unit 45 detects coil currents from output signals of the coil current detection unit 25b and the coil current detection unit 25c. The load determination unit 46 determines, from the input current thus detected, the coil currents thus detected, and the load determination table stored in advance in the memory 48, whether a heating target is placed above each heating coil. The control unit 45 controls the driver circuit 50e and the driver circuit 50f according to a result of the load determination process and performs a heating operation appropriate to induction heating power and the cooking menu.

When a cooking menu in which the heating target 5a1 is subjected to cooking with heat in the convector mode is selected by an input from the operation unit 40, the control unit 45 performs a heating operation of producing convection in a liquid cooking target contained in the heating target 5a1.

Specifically, when the convector mode is selected from the cooking menu, the control unit 45 brings the switch 26 of the driver circuit 50e into an off state. This causes the resonant frequency of the second resonant circuit to be changed from the first resonant frequency f1 to the second resonant frequency f2. By changing the driving frequency of the inverter circuit 23 of the driver circuit 50e, the control unit 45 changes the magnitude of electric power that is supplied to the first heating coil 1a and the second heating coil 1b.

A relationship between electric power that is supplied to each heating coil and a resonant frequency is described here.

Figure 56:
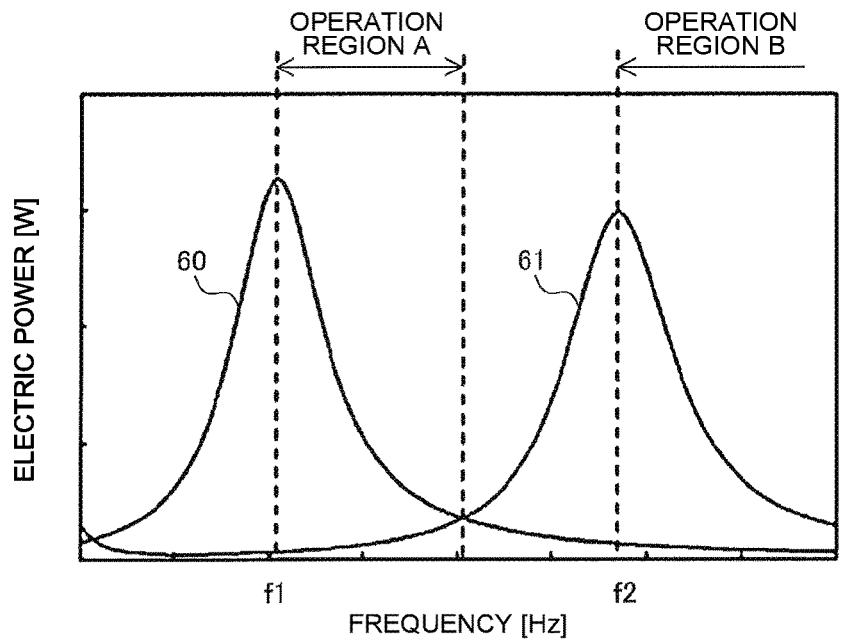
FIG. 56 is a conceptual diagram showing a relationship between a driving frequency of the induction cooker according to Embodiment 6 and electric power that is supplied to the heating coils.

FIG. 56 is a conceptual diagram showing a relationship between a driving frequency of the induction cooker according to Embodiment 6 and electric power that is supplied to the heating coils.

In FIG. 56, the first resonant circuit and the second resonant circuit whose switch 26 is in an on state have a characteristic that peaks at the first resonant frequency f1 as indicated by an electric power characteristic 60. Further, the second resonant circuit whose switch 26 is in an off state has a characteristic that peaks at the second resonant frequency f2 as indicated by an electric power characteristic 61.

The control unit 45 has, as a preset operation region A, a range of frequencies that are equal to or higher than the first resonant frequency f1 and at which the electric power characteristic 60 is greater in electric power than the electric power characteristic 61. Further, the control unit 45 has, as a preset operation region B, a range of frequencies that are equal to or higher than the second resonant frequency f2. An upper-limit frequency of the operation region B is set at an upper limit value of an operating range of the driver circuit 50e, for example, 100 kHz.

When the driver circuit 50e is driven at a driving frequency falling within the range of the operation region A, the first resonant circuit and the second resonant circuit whose switch 26 is in an on state are supplied with more electric power than the second resonant circuit whose switch 26 is in an off state.

Further, when the driver circuit 50e is driven at a driving frequency falling within the range of the operation region B, the first resonant circuit and the second resonant circuit whose switch 26 is in an on state is supplied with less electric power than the second resonant circuit whose switch 26 is in an off state.

Thus, after having brought the switch 26 into an off state upon selection of the convector mode, the control unit 45 alternately switches the driving frequency of the inverter circuit 23 of the driver circuit 50e between a driving frequency falling within the range of the operation region A and a driving frequency falling within the range of the operation region B.

This effects alternate switching between the operation of supplying more electric power to the first heating coil 1a than to the second heating coil 1b and the operation of supplying more electric power to the second heating coil 1b than to the first heating coil 1a.

In supplying the same electric power to the first heating coil 1a and the second heating coil 1b upon selection of a cooking menu such as a normal heating mode, the control unit 45 brings the switch 26 into an on state and changes the resonant frequency of the second resonant circuit to the first resonant frequency f1. As a result, the same electric power is supplied to the first heating coil 1a and the second heating coil 1b.

(Effects)

As noted above, in Embodiment 6, two heating coils can be driven by the single driver circuit 50e. This makes it possible to make the driver circuit 50 simpler in configuration than those of the induction cookers 100 according to Embodiments 1 to 5.

Further, the magnitude of electric power that is supplied to two or more heating coils can be changed by changing the driving frequency of the driver circuit 50 and the capacitance of the second resonant circuit.

The configuration and operation of the induction cooker 100 according to Embodiment 6 may be combined with any of Embodiments 1 to 5. For example, a single driver circuit 50 may be configured to drive the first to fourth heating coils 1a to 1d, and a resonant capacitor forming a resonant circuit with each of the heating coils has a variable capacitance. Moreover, by changing the capacitance of the resonant capacitor and the driving frequency of the driver circuit 50, the control unit 45 can arbitrarily change the magnitude of electric power that is supplied to two or more heating coils.

(Modification 1)

Figure 57:
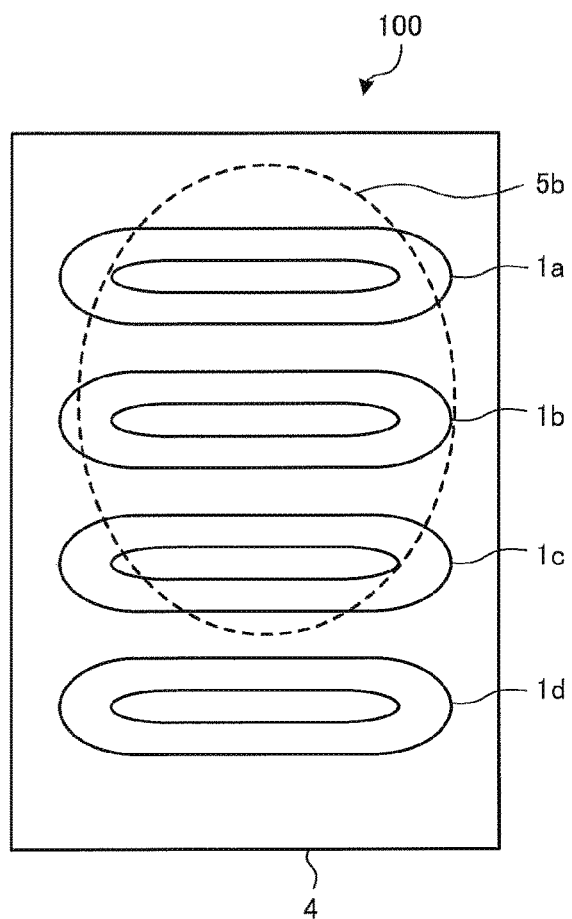
FIG. 57 is a plan view schematically showing a plurality of heating coils of an induction cooker according to Modification 1.

FIG. 57 is a plan view schematically showing a plurality of heating coils of an induction cooker according to Modification 1.

As shown in FIG. 57, the first to fourth heating coils 1a to 1d may be aligned in one row, for example, in a longitudinal direction of the top plate 4. This configuration makes it possible to perform an operation that is the same as those of Embodiments 1 to 6 and bring about effects that are the same as those of Embodiments 1 to 6.

(Modification 2)

Although each of Embodiments 1 to 6 has described a configuration in which the induction cooker 100 includes four heating coils, namely the first to fourth heating coils 1a to 1d, this is not intended to impose any limitation on the present invention.

A configuration may be provided such that a plurality of heating openings are provided and a plurality of heating coils are aligned in one row for one of the plurality of heating openings.

Figure 58:
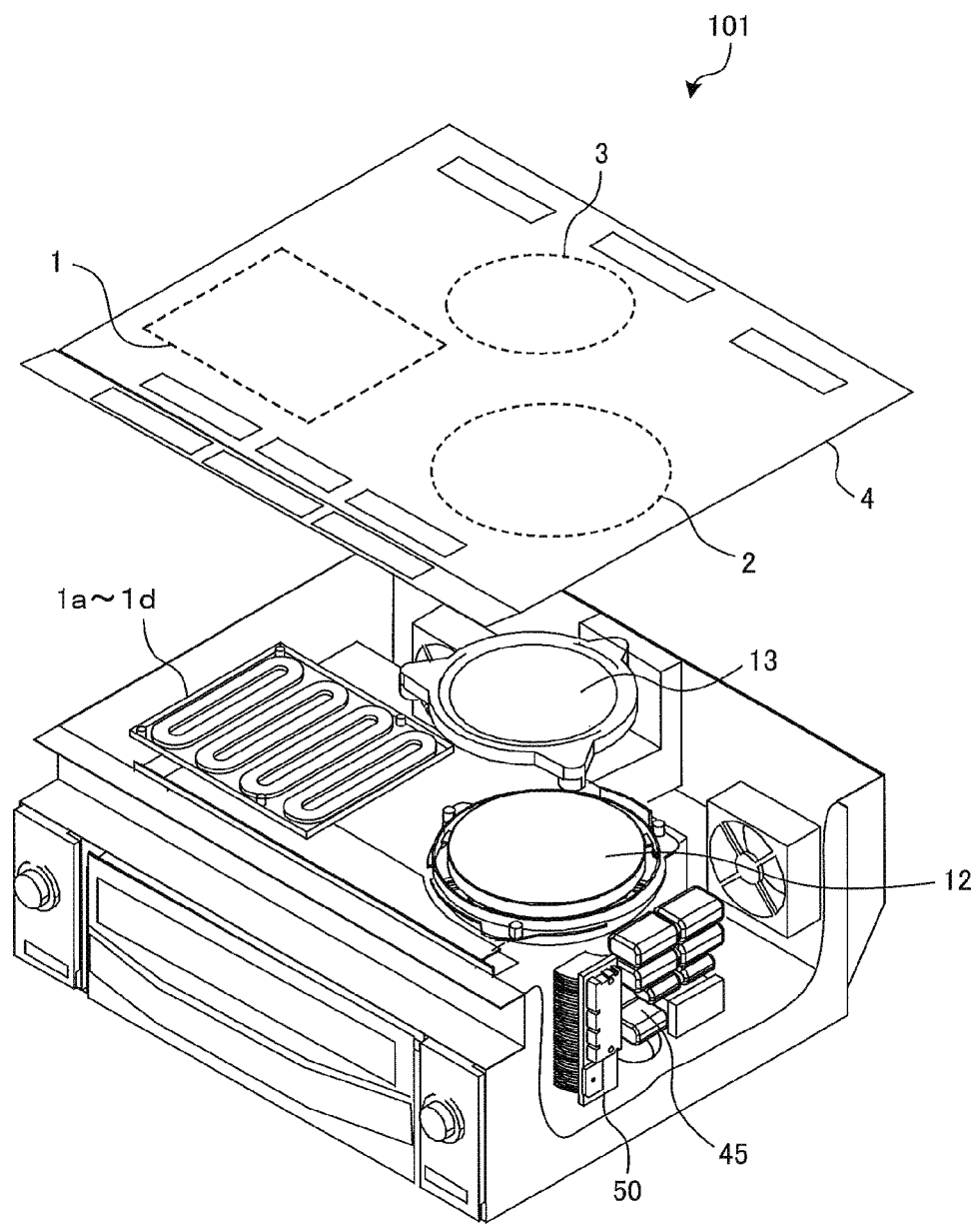
FIG. 58 is an exploded perspective view showing an induction cooker according to Modification 2.

FIG. 58 is an exploded perspective view showing an induction cooker according to Modification 2.

For example, as shown in FIG. 58, in an induction cooker 101 including a first heating opening 1, a second heating opening 2, and a third heating opening 3, the first to fourth heating coils 1a to 1d may be aligned in one row below the first heating opening 1. A heating coil 12 disposed below the second heating opening 2 and a heating coil 13 disposed below the third heating opening 3 are constituted, for example, by circular coils.

In this configuration, too, an operation that is the same as those of Embodiments 1 to 6 can be applied to the first heating opening 1.

The invention claimed is:

1. An induction cooker comprising:
a plurality of heating coils aligned in one row on a same plane;
a plurality of inverter circuits configured to supply high-frequency power to the plurality of heating coils;
a load determination unit comprising a plurality of coil current detectors configured to determine whether a heating target is placed above each of the plurality of heating coils; and
a controller configured to control driving of the plurality of inverter circuits based on a result of detection by the load determination unit, the controller having a memory and a load determination table stored in the memory,
wherein
the plurality of heating coils are formed in elliptical shapes in plan view, and
the plurality of heating coils aligned in one row have minor axes aligned on a same straight line, and
the controller is configured to, when the heating target is placed over adjacent two or more of the plurality of heating coils, supply electric power to at least one, but not all, of the two or more adjacent ones of the plurality of heating coils and, over time, sequentially switch the heating coils to which the power is supplied by stopping supply of electric power to at least one of the two or more adjacent ones of the plurality of heating coils and supplying electric power to at least another of the two or more adjacent ones of the plurality of heating coils.

2. An induction cooker comprising:
a plurality of heating coils aligned in one row on a same plane;
a plurality of inverter circuits configured to supply high-frequency power to the plurality of heating coils;
a load determination unit comprising a plurality of coil current detectors configured to determine whether a heating target is placed above each of the plurality of heating coils; and
a controller configured to control driving of the plurality of inverter circuits based on a result of detection by the load determination unit, the controller having a memory and a load determination table stored in the memory,
wherein
the plurality of heating coils are formed in elliptical shapes in plan view, and
the plurality of heating coils aligned in one row have minor axes aligned on a same straight line, and
wherein the controller is configured to, when the heating target is placed over adjacent two or more of the plurality of heating coils, supply more electric power to at least one, but not all, of the two or more adjacent ones of the plurality of heating coils than to one or more, but not all, other ones of the two or more adjacent ones of the plurality of heating coils and sequentially switch, over time, the heating coils to which the more power is supplied.

3. The induction cooker of claim 1, wherein the controller is configured to, when the heating target is placed over adjacent two or more of the plurality of heating coils, supply electric power to one of the two or more of the plurality of heating coils and alternate the heating coils to which the power is supplied.

4. The induction cooker of claim 1,
wherein the controller is configured to, when the heating target is placed over adjacent three or more of the plurality of heating coils, alternately switch between supply of electric power to inside one or more of the three or more adjacent ones of the plurality of heating coils, the inside one or more of the three or more adjacent ones of the plurality of heating coils each being disposed between two others of the three or more adjacent ones of the plurality of heating coils, and supply of electric power to outside two or more of the three or more adjacent ones of the plurality of heating coils.

5. The induction cooker of claim 1, wherein the controller is configured to, when the heating target is placed over adjacent three or more of the plurality of heating coils, supply electric power to a set of adjacent two or more of the three or more adjacent ones of the plurality of heating coils and sequentially switch, over time, the set of the adjacent two or more of the three or more adjacent ones of the plurality of heating coils.

6. The induction cooker of claim 4, wherein the controller is configured to, when the heating target is placed over adjacent three or more of the plurality of heating coils,
make a product of
electric power supplied to outside two or more of the three or more adjacent ones of the plurality of heating coils and
a duration of conduction to outside two or more of the three or more adjacent ones of the plurality of heating coils
larger than a product of
electric power supplied to the inside one or more of the three or more adjacent ones of the plurality of heating coils and
a duration of conduction to the inside one or more of the three or more adjacent ones of the plurality of heating coils.

7. The induction cooker of claim 1, wherein the controller is configured to, when the heating target is placed over adjacent two or more of the plurality of heating coils, equalize products of electric power supplied to the two or more adjacent ones of the plurality of heating coils and a duration of conduction.

8. The induction cooker of claim 1,
wherein the controller is configured to, when the heating target is placed over a set of adjacent two of the plurality of heating coils and there are two adjacent sets of adjacent two of the plurality of heating coils, alternately switch between supply of electric power to an outside one of the heating coils of each of the two adjacent sets and supply of electric power to an other inside one of the heating coils of each of the two adjacent sets, the inside one of the heating coils of each of the two adjacent sets being disposed between two others of the heating coils of the two adjacent sets.

9. The induction cooker of claim 8, wherein the controller is configured to make a duration of simultaneous supply of electric power to outside two of the heating coils shorter than a duration of simultaneous supply of electric power to inside two of the heating coils.

10. The induction cooker of claim 8, wherein the controller is configured to make zero a duration of simultaneous supply of electric power to inside two of the heating coils, the inside being a direction to a center of the plane.

11. The induction cooker of claim 1, wherein the controller is configured to, in supplying electric power to adjacent two of the plurality of heating coils, cause electric currents to flow in a same direction as each other through facing portions of the two adjacent ones of the plurality of heating coils.

12. The induction cooker of claim 1, wherein
at least one of the plurality of inverter circuits is configured to supply high-frequency power to two or more of the plurality of heating coils and includes a plurality of resonant capacitors forming a resonant circuit with each of the two or more of the plurality of heating coils,
at least one of the plurality of resonant capacitors has a variable capacitance, and
the controller is configured to, by changing the capacitance of the resonant capacitor and a driving frequency of the inverter circuit, change a magnitude of electric power supplied to the two or more of the plurality of heating coils.

13. The induction cooker of claim 1, wherein the plurality of heating coils have a same shape and a same size as one another.

14. The induction cooker of claim 1, wherein the plurality of heating coils are aligned so that a spacing between adjacent two of the plurality of heating coils is shorter than a half of a length of the minor axis of each of the plurality of heating coils.

* * * * *